United States Patent [19]
Ohta

[11] Patent Number: 5,633,764
[45] Date of Patent: May 27, 1997

[54] MAGNETIC TAPE RECORDING/ REPRODUCING APPARATUS

[75] Inventor: Haruo Ohta, Hirakata, Japan

[73] Assignee: Matsushita Electric Industrial Co., Ltd., Osaka, Japan

[21] Appl. No.: 365,217

[22] Filed: Dec. 28, 1994

[30] Foreign Application Priority Data

Dec. 28, 1993 [JP] Japan .................................. 05-334196

[51] Int. Cl.$^6$ ...................................................... G11B 5/00
[52] U.S. Cl. .................................. 360/7; 360/8; 360/74.1
[58] Field of Search .......................... 360/7, 8, 9.1, 10.1, 360/10.3, 11.1, 27, 71, 72.1, 13, 14.1, 33.1, 74.1

[56] References Cited

U.S. PATENT DOCUMENTS

| | | | |
|---|---|---|---|
| 4,897,741 | 1/1990 | Inoue et al. | 360/7 X |
| 4,982,390 | 1/1991 | Tanaka | 360/7 X |
| 5,345,430 | 9/1994 | Moe | 360/7 X |
| 5,363,264 | 11/1994 | Cavanaugh et al. | 360/11.1 |

OTHER PUBLICATIONS

"A Consumer Digital VCR for Advanced Television", Hiroo Okamoto et al., IEEE Transactions on Consumer Electronics, vol. 39, No. 3, Aug. 1993.

Primary Examiner—Andrew L. Sniezek
Attorney, Agent, or Firm—Wenderoth, Lind & Ponack

[57] ABSTRACT

A magnetic a tape recording/reproducing apparatus comprises a tape running unit, a recording and reproducing unit, a data memory, and a controller. The controller controls the tape running unit, the data memory and the recording and reproducing unit such that, in a recording mode, the input data are continuously written into the data memory at a first data rate and the written data are intermittently read out from the data memory at a second data rate which is higher than the first data rate and intermittently recorded onto a magnetic tape, and that, in a reproduction mode, the recorded data are intermittently reproduced from the magnetic tape and intermittently written into the data memory at the second data rate and the written data are continuously read out from the data memory at the first data rate. The controller is responsive to indication information indicating that the tape is not in a recordable or reproducible position for stopping reading operation in the recording mode and writing operation in reproduction mode of the data memory and operation of the recording and reproducing unit and for controlling the tape running unit to transfer the tape to a recordable or reproducible position.

7 Claims, 12 Drawing Sheets

MAGNETIC TAPE RECORDING/ REPRODUCING APPARATUS

BACKGROUND OF THE INVENTION

1. Field of the Invention

This invention relates to a magnetic tape recording/ reproducing apparatus reproducing video signals or audio for recording and/or signals.

2. Description of the Prior Art

Nowadays most families own video tape recorders (hereinafter abbreviated as VTR) for recording and/or reproducing video-and audio signals.

As home-use VTRS, the VHS system, 8 mm system and the like are known, each of which allows video and audio signals having a length of about two to eight hours to be recorded on a cassette housing a magnetic tape therein.

In this case, however, the home-use-VTRs have many problems on a practical basis.

First, when a program is to be recorded, such a cassette that has a necessary blank region to record the program therein or that has an erasable program which can be recorded over must be selectively found from a plurality of cassettes. If a time period needed for recording the program on one cassette is long, the number of useable cassettes is decreased. In this case, however, in order to find a recordable space on a cassette, operations such as rewinding, fast forwarding and the like have to be repeated. These operations are extremely complicated and in some cases, may not be made timely before starting the program, resulting in problem in that the program cannot be recorded from the beginning.

Second, when reproducing a desired program which has been already recorded, a cassette having the desired program must be found from a plurality of cassettes. Furthermore, operations such as rewinding, fast forwarding and the like have to be repeated in order to find the desired program on the cassette. These operations are also extremely complicated.

In addition, many home-use VTRs having a digital recording system have been manufactured on a trial basis. One of the many home-use VTRs has been proposed in a report, Hiroo Okamoto, et. al, "A consumer digital VCR for advanced television". IEEE Transactions on Consumer Electronics, Vol. 93, No. 3, pp. 199–204 (August, 1993). However, with the many home-use VTRs having a digital recording system and manufactured on a trial basis, the above-mentioned problems cannot be solved.

In addition, regardless of whether an analog recording system or a digital recording system is used, conventional VTRs record inputted video and audio Signals sequentially on a real-time basis, and thus, it is impossible to solve the above-mentioned problems.

SUMMARY OF THE INVENTION

In order to solve the above-mentioned problems, an object of this invention is to provide a magnetic tape recording/ reproducing apparatus which does not need any operations such as rewinding, fast forwarding and the like for making an access to a recordable position when recording.

Another object of this invention is to provide a magnetic tape recording/reproducing apparatus which does not need any the like for need a waiting time in order to make and need a waiting time in order to make an access to a recordable position when recording and even in a case of rapid recording, allows a program to be recorded from the beginning thereof.

Furthermore, another object of this invention is to provide a magnetic tape recording/reproducing apparatus which does not need any operation such as rewinding, fast forwarding and the like for making an access to a desired program even when the reproducing.

Still another further object of this invention is to provide a magnetic tape recording/reproducing apparatus which allows one cartridge (cassette) to be recorded for a very long period of time and does not need the changing of the cassette in almost all cases so that the annoyance of looking for a recordable cassette when recording or looking for a cassette having the desired program when reproducing can be eliminated.

To achieve the above objects, the present invention provides a magnetic tape recording/reproducing apparatus for recording input data inputted sequentially at a first data rate onto a magnetic recording tape in a recording mode and for reproducing the recorded data in a reproduction mode. This apparatus comprises: a tape running means for moving the magnetic recording tape from one position to another; a recording and reproducing means for recording the input data on the magnetic recording tape at a data rate and for reproducing the recorded data from the magnetic recording tape in the reproduction mode; a data memory means coupled to the recording and reproducing means for temporarily storing therein the input data before being fed to the recording and reproducing means in the recording mode and for temporarily storing therein reproduced data from the recording and reproducing means in the reproducing mode; and a control means for controlling the tape running means, the recording and reproducing means and the data memory means.

In one aspect of the invention, the control means controls the tape running means, the recording and reproducing means and the data memory means to cooperate such that, in the recording mode, the input data are continuously written into the data memory means at the first data rate and the written data are intermittently read out from the data memory means at a second data rate which is higher than the first data rate and intermittently recorded onto the magnetic recording tape, and that, in the reproduction mode, the recorded data are intermittently reproduced from the magnetic recording tape and intermittently written into the data memory means at the second data rate and the written data are continuously read out from the data memory at the first data rate. The data memory means may have one of a semiconductor memory and a disk-type recording medium.

In a preferred manner, the control means may control the tape running means, the magnetic recording and reproducing means and the data memory means in the recording mode to operate (1) such that the data stored in the data memory means are read out from the data memory means and recorded on the magnetic recording tape from a time when an amount of the data stored in the data memory means exceeds a first predetermined data amount until a time when the amount of the data stored in the data memory means becomes a second predetermined data amount which is smaller than the first predetermined data amount, and (2) such that the magnetic recording tape is stopped and the data stored in the data memory means are not read out from the data memory means and not recorded onto the magnetic recording tape from the time when the amount of the data stored in the data memory means becomes the second predetermined data amount until a time when the amount of the data stored in the data memory means again becomes the first predetermined data amount. Also, the control means may control the tape running means, the magnetic recording and reproducing means and the data memory means in the reproduction mode to operate (1) such that the recorded data are reproduced from the magnetic recording tape and written into the data memory means from a time when an amount of the data stored in the data memory means becomes smaller than a first predetermined data amount until a time-when the amount of the data stored in the data memory means becomes a second predetermined data amount which is larger than the first predetermined data amount and (2) such that the magnetic recording tape is stopped and the recorded data are not reproduced from the magnetic recording tape and not written into the data memory means from the time when the amount of the data stored in the data memory means becomes the second predetermined data amount until a time when the amount of the data stored in the data memory means again becomes the first predetermined data amount.

In another aspect of the invention, the control means controls the tape running means, the recording and reproducing means and the data memory means to cooperate such that, in the recording mode, the input data are continuously written into the data memory means at the first data rate and the written data are intermittently read out from the data memory means at selectively one of the first data rate and a second data rate which is higher than the first data rate and intermittently recorded onto the magnetic recording tape, and that, in the reproduction mode, the recorded data are intermittently reproduced from the magnetic recording tape and intermittently written into the data memory means at selectively one of the first data rate and the second data rate and the written data are continuously read out from the data memory means at the first data rate.

In a preferred manner in this aspect, the control means may control the tape running means, the magnetic recording and reproducing means and the data memory means in the recording mode to operate such that, when an amount of the data stored in the data memory means is larger than a predetermined data amount, the data stored in the data memory means are read out from the data memory means at the second data rate and recorded on the magnetic recording tape until a time when the amount of the data stored in the data memory means becomes the predetermined data amount, and such that, when the amount of the data stored in the data memory means is smaller than the predetermined data amount, the data stored in the data memory means are read out from the data memory means at the first data rate and recorded onto the magnetic recording tape. Also, the control means may control the tape running means, the magnetic recording and reproducing means and the data memory means in the reproduction mode to operate such that, when an amount of the data stored in the data memory means is smaller than a predetermined data amount, the recorded data are reproduced from the magnetic recording tape and written into the data memory means at the second data rate until a time when the amount of the data stored in the data memory means becomes the predetermined data amount, and such that, when the amount of the data stored in the data memory means is larger than the predetermined data amount, the recorded data are reproduced from the magnetic recording tape and written into the data memory means at the first data rate.

In still another aspect of the invention, the apparatus in each of the above two aspects further comprises a means for producing indication information indicating whether or not the magnetic recording tape is in a recordable or reproducible position. The control means is responsive to the indication information for controlling the tape running means, the magnetic recording and reproducing means and the data memory means in the recording mode to operate, when the indication information indicates that the magnetic recording tape is not in a recordable position, such that the data stored in the data memory means are not read out from the data memory means and not recorded onto the magnetic recording tape and the magnetic recording tape is moved until the magnetic recording tape moves to a position in which the indication information indicates that the magnetic recording tape is in a recordable position. The control means is responsive to the indication information for controlling the tape running means, the magnetic recording and reproducing means and the data memory means in the reproduction mode to operate, when the indication information indicates that the magnetic recording tape is not in a reproducible position, such that the recorded data are not reproduced from the magnetic recording tape and not written into the data memory means until the magnetic recording tape is transferred to a position in which the indication signal indicates that the magnetic recording tape is in a reproducible position. The indication information may be stored in an information memory and may contain information such as recordable areas on the tape and positions of recorded programs on the tape.

According to the present invention structured as above, the user need not consider the recording position and the reproducing position on the tape, and need not manipulate the controls to perform a rewinding operation or a fast-forwarding operation. Further, even if the tape is not in a recordable position when the user wants to record a television program and quickly starts the apparatus to operate in the recording mode, the program can be recorded from the first, because the input data inputted during when the tape is being transferred to a recordable position are stored in the data memory. Further, even if program has been recorded in dispersed separate areas on the tape, the program can be reproduced continuously, because the data reproduced from the recording and reproducing means are once stored in the data memory in an intermittent manner and read out from the data memory continuously. Further, since it is not necessary to record each program in a continuous area on the tape, the entire recording areas on the tape can be efficiently used. Further, since the rewinding operation and fast-forward operation are not necessary, a long time recording can be effected by using one tape cassette. This would reduce the work of replacing the cassette or the work of finding a cassette having a residual recordable area or a cassette having an unwanted program recorded therein.

DESCRIPTION OF THE PREFERRED EMBODIMENTS

A first embodiment of this invention will be described below while referring to FIG. 1.

Figure 1:
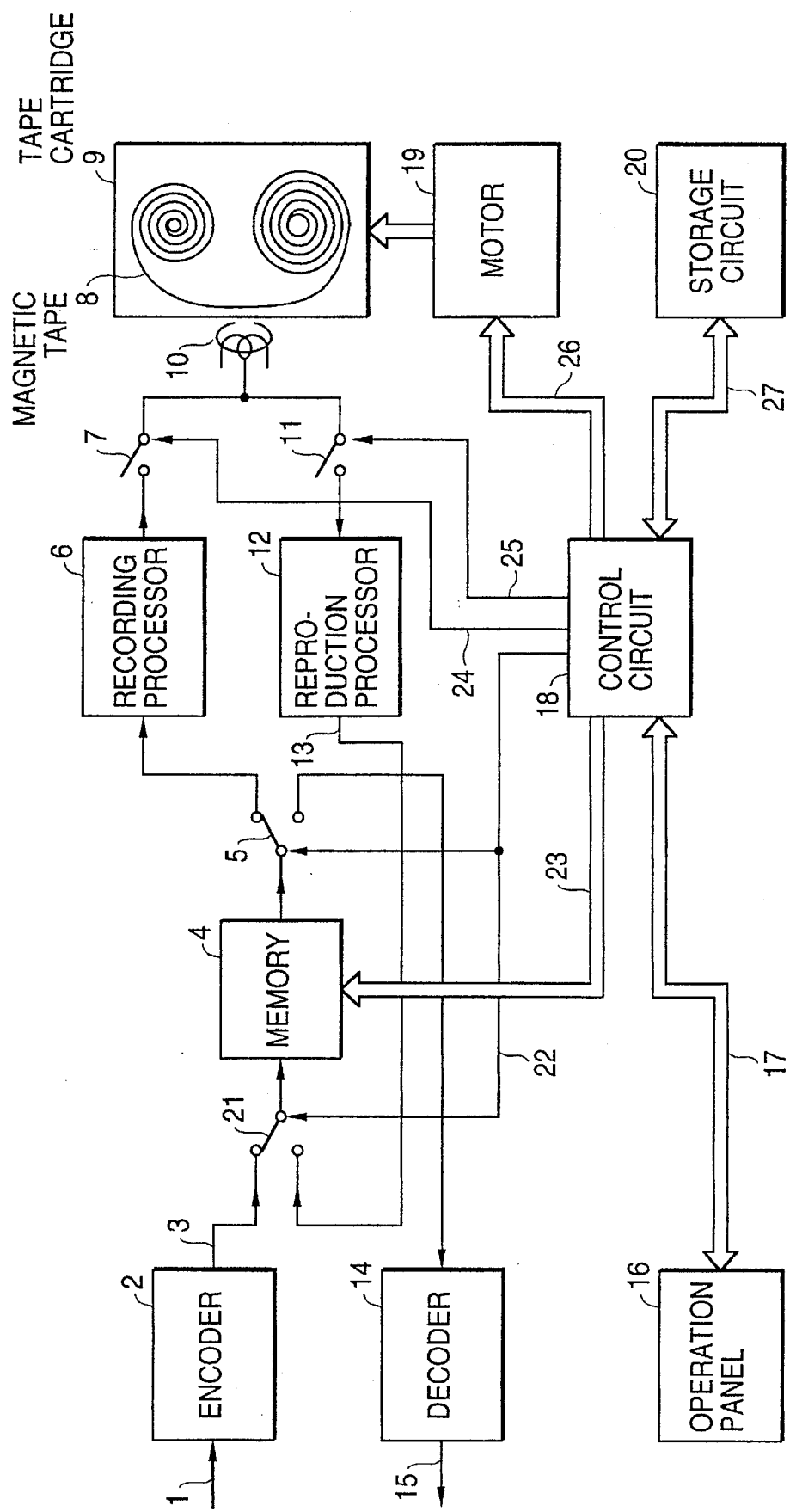
FIG. 1 is a block diagram of a magnetic recording/reproducing apparatus according to first and second embodiments of this invention.

FIG. 1 is a block diagram of a magnetic tape recording/ reproducing apparatus according to the first embodiment.

First, an operation of the magnetic tape recording/ reproducing apparatus when recording will be explained below. When recording, a recording indication signal is supplied from an operation panel 16 to a control circuit 18 via a bus 17. The control circuit 18 controls a switch 21, a switch 5, a memory 4, a switch 7 and a motor 19.

Video and audio signals to be recorded are digitized and received by an encoder 2 as a signal 1. The encoder 2 data-compresses the signal 1 to reduce the amount of information and adds thereto an error correction code word, a synchronizing code word and an identification (ID) code word and outputs the result as a signal 3. A data rate of Q bits/sec (Q is a positive real number) of the signal 3 is supposed to be 5 Mbits/sec (Q=5×10$^6$) in this case. The switch 21 is switched to an upper side when recording in response to a control signal 22 from the control circuit 18. As a result, the signal 3 is sent to the memory 4. The memory 4 is made of a semiconductor memory (first-in first-out memory: FIFO memory) which can read out data in the order it was written in and can execute writing in and reading out synchronously. Also, the memory 4 has a storage capacity so as to store video and audio signals compressed to 5 Mbits/sec for 2 minutes. The memory 4 is controlled in response to a control signal 23 from the control circuit 18 and always receives the signal 3 at a rate of 5 Mbits/sec sequentially. On the other hand, the data are read out intermittently from the memory 4 in the order that it was written in at a higher rate of 15 Mbits/sec. The switch 5 is always switched to the upper side when recording in response to the control signal 22 from the control circuit 18. As a result, the data read out from the memory 4 is supplied to a recording processor 6. The recording processor 6 modulates the data read out from the memory 4. The switch 7 is controlled in response to a control signal 24 from the control circuit 18 and is closed only during a time period when the data are being read out from the memory 4 intermittently. As a result, the data read out from the memory 4 and modulated by the recording processor 6 are supplied to a magnetic head 10.

On the other hand, a tape cartridge 9 houses a magnetic tape 8 and is approximately equal in size to cassettes for VHS-VTR use. Also, the magnetic tape 8 has a recording density of about I bit/μm$^2$. As a result, the tape cartridge 9 makes it possible to record video and audio signals compressed to 5 Mbits/sec for about 200 hours. Such a high density recording has been already made possible by the prior art. A motor 19 moves the magnetic tape 8. The motor 19 is controlled in response to a control signal 26 from the control circuit 18 in order to make the magnetic tape 8 stop, rewind at high speed, fast forward at a high speed, or fast forward at triple speed when recording or reproducing at a rate of 15 Mbits/sec. In a case of high speed fast forwarding or high speed rewinding, the magnetic tape 8 can be moved from can be moved from an arbitrary position to any other arbitrary position within a time period of T seconds (in this embodiment, T=90). Such a high speed running as shown above has already been practically realized. In addition, the memory 4 has a capacity of storing video and audio signals compressed to 5 Mbits/sec as shown above for two minutes, having a storage capacity of over Q·T bits (T is a positive real number).

In this case, during the time period that the data are being read out from the memory 4 intermittently, the magnetic tape 8 is fast forwarded at triple speed, and the data are supplied to the magnetic head 10 to be recorded at a rate of 15 Mbits/sec. On the other hand, during the time period when the data are not being read out from the memory 4, recording is not executed because the switch 7 is opened in response to the control signal 24 of the control circuit 18. Also, during the time period as such, the magnetic tape 8 is being stopped, fast forwarded at high speed or rewound at high speed.

If the magnetic tape 8 is not at a recordable position, the control circuit 18 controls the motor 19 so as to move the magnetic tape 8 to the recordable position and simultaneously controls the memory 4 and the switch 7 so as to stop reading out the data from the memory 4 and recording the data on the magnetic tape 8, respectively, until the magnetic tape 8 arrives at the recordable position. If the magnetic tape 8 is at the recordable position, the control circuit 18 controls the memory 4, the switch 7 and the motor 19 so as to read out memory 4 and record the data on the magnetic tape 8 until an amount of residual data which are stored in and not yet read out from the memory 4 is equal to zero from a time point when the amount of residual data corresponds to 30 or more seconds of video and audio signals and simultaneously controls the memory 4, the switch 7 and the motor 19 so as to stop the tape running until the amount of residual data of the memory 4 corresponds to 30 seconds from a time point when it was equal to zero as well as to stop reading out from the memory 4 and recording on the magnetic tape.

Here, the reading out control of the memory 4 and tape running control of the motor 19 which are effected by the control circuit 18 when recording will be further concretely explained below.

Figure 2:
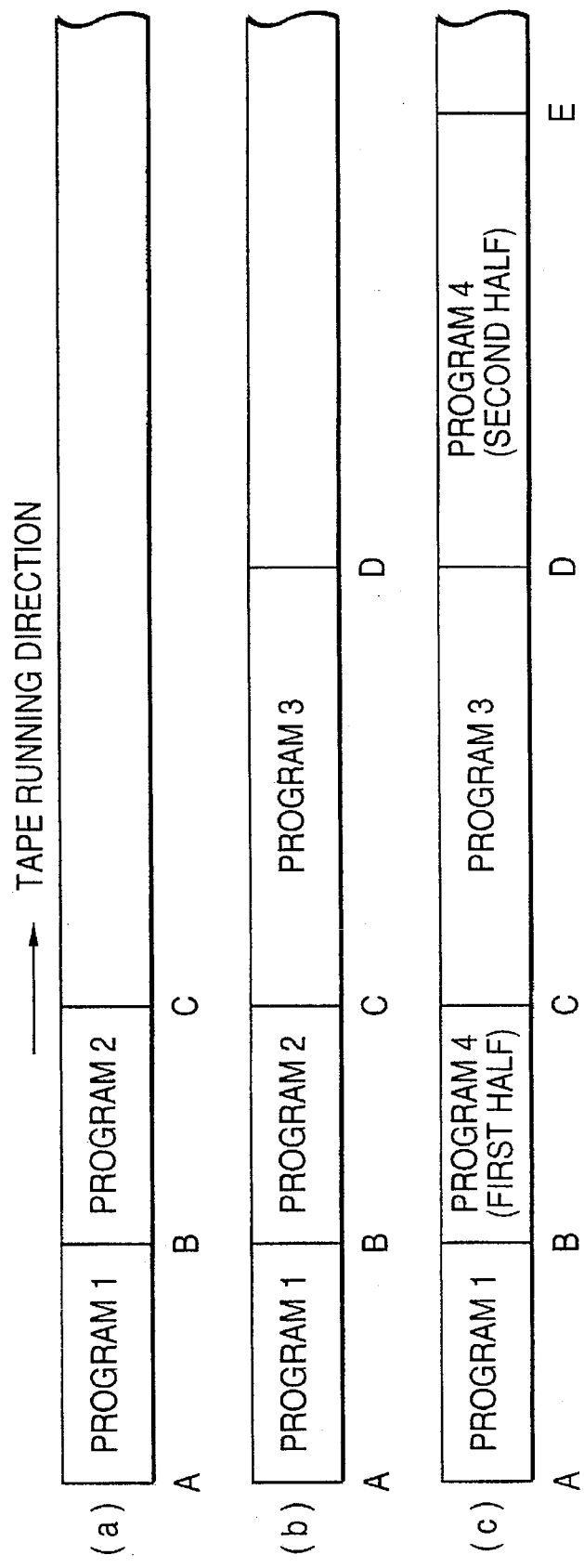
FIGS. 2(a)–2(c) are diagrams showing a recorded state of a magnetic tape for explaining an operation of the magnetic tape recording/reproducing apparatus according to the first and second embodiments.

FIGS. 2(a)–2(c) are diagrams showing a recorded state of the magnetic tape 8. In FIGS. 2(a)–2(c), the data is recorded or reproduced from the left to the right side. Here, the recorded state of the magnetic tape is supposed to be as shown in FIG. 2(a). That is, a "program 1" having a length of 30 minutes is recorded on the tape from a tape position A to a tape position B and a "program 2" having a length of 30 minutes is recorded thereon from the tape position B to a tape position C. Tape positions after the tape position C have no program recorded in this case.

The recorded state of the magnetic tape 8 in the tape cartridge 9, that is, a content concerning whether any tape position has the data recorded or not or other content such as a name of a program, if the data are recorded, are stored in a storage circuit 20 shown in FIG. 1. The content and the other content are referred or renewed from or by the control circuit 18 via a bus 27. Out of the content and the other content of the storage circuit 20, program names or information concerning any residual recordable time and the like which are being already stored there in are displayed on the operation panel 16 through the bus 27, the control circuit 18 and the bus 17.

Now, suppose that the recorded state of the magnetic tape is as shown in FIG. 2(a), the magnetic head 10 is placed in the tape position A and a "program 3" having a length of one hour is intended to be newly recorded. The reading out control of the memory 4 and the tape running control of the motor 19 which are effected by the control circuit 18 will be explained below by referring to FIG. 3.

Figure 3:
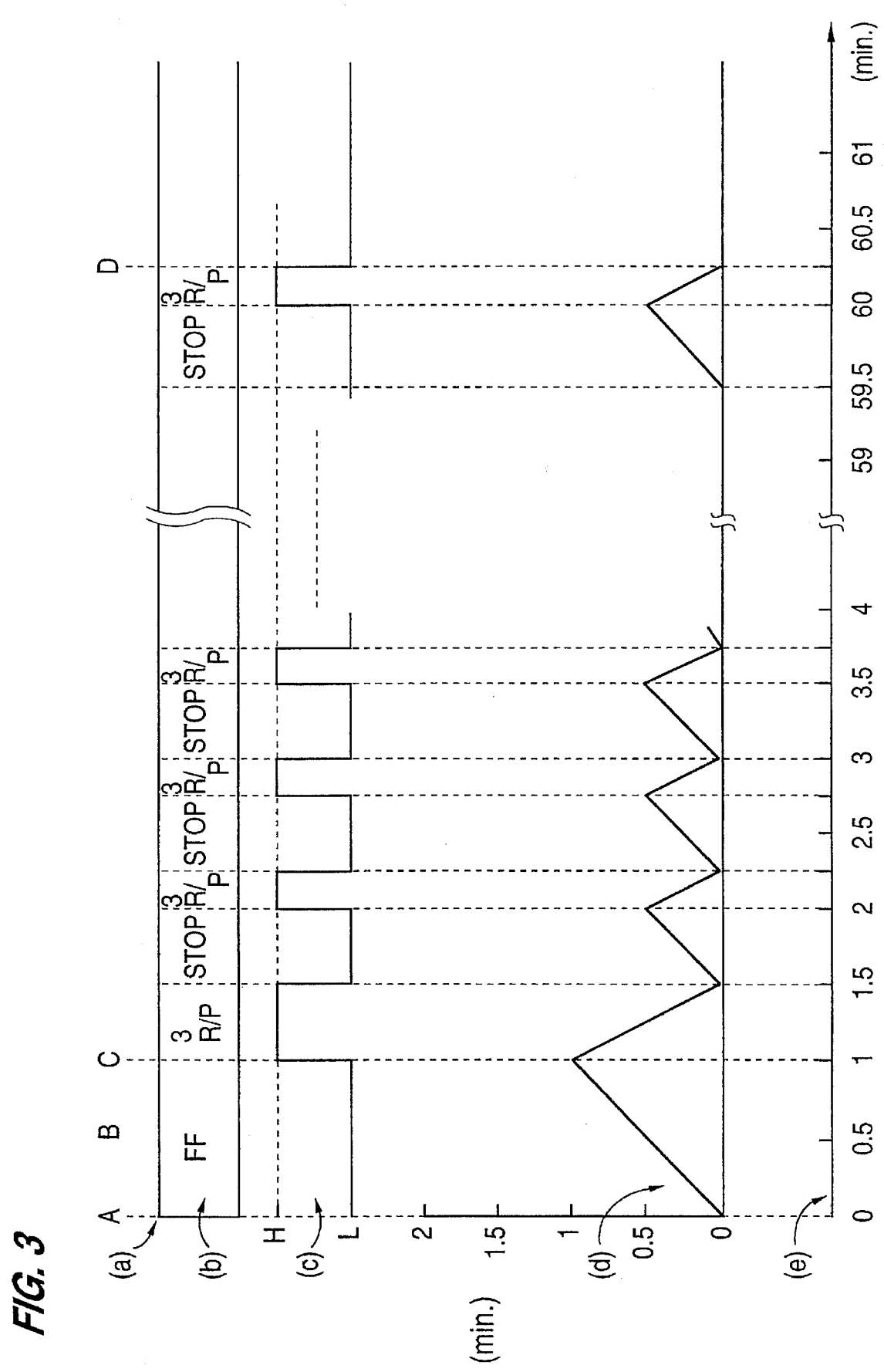
FIG. 3 is a diagram for explaining an operation of the magnetic tape recording/reproducing apparatus according to the first embodiment when recording.

FIG. 3. is a diagram for explaining an operation of the magnetic tape recording/reproducing apparatus as a function of the time so that a time point when recording of the "program 3" is indicated is to be zero. In FIG. 3, (a) shows the tape position at each time correspondingly to FIG. 2(a); (b) shows a tape running state at each time in which "FF", "STOP" and "3R/P" denote high speed fast forwarding, stoppage and triple speed fast forwarding, respectively, and (c) shows an intermittent reading out state of the memory 4, showing that reading out is carried out at a level "H". Also, (d) of FIG. 3 shows an amount of data which are written into the memory 4 and not read out therefrom at each time, that is, an amount of residual data of the memory 4 is shown as a function of a time of a video signal, and (e) of FIG. 3 shows a time axis.

An indication of recording the "program 3" having a length of one hour is sent via the operation panel 16 to the control circuit 18 at the zero time point. In this case, the magnetic head 10 is placed in the tape position A. The control circuit 18 refers to information of the recorded state stored in the storage circuit 20 and controls the motor 19 so as to feed the magnetic tape 8 at a high speed to the tape position C where recording is possible (see (b) of FIG. 3). Also, the control circuit 18 controls the memory 4 so as not to read out the data from the memory 4 up to the time point when the magnetic head arrives at the tape position C (see (c) of FIG. 3), thereby opening the switch 7. As a result, recording on the magnetic tape 8 is not performed until the time point when the magnetic head arrives at the tape position C. In addition, the data are sequentially written into the memory 4 (see (d) of FIG. 3). If the tape position arrives at the tape position C at a time point of one minute, the control circuit 18 controls the motor 19 so as to move the magnetic tape 8 at triple speed (see (b) of FIG. 3). Also, reading out the data from the memory 4 is started, the switch 7 is closed, and the data are recorded into the magnetic tape 8. New data are always written into the memory 4 while simultaneously reading out the data therefrom. In this case, however, reading out is made at a rate of 15 Mbits/sec which is three times that of the writing, so that the amount of residual data of the memory 4 becomes zero at the time point of 1 minute and 30 seconds (see (d) of FIG. 3).

When the amount of the residual data of the memory 4 becomes zero at the time point of 1 minute and 30 seconds, the control circuit 18 controls the motor 19 so as to stop the running of the magnetic tape 8. Also, reading out the data from the memory 4 is stopped and recording the data on the magnetic tape 8 is interrupted.

During the time period from the time point of 1 minute and 30 seconds to the time point of 2 minutes, the data are written into the memory 4 (see (d) of FIG. 3). When the amount of the residual data of the memory 4 is equal to 30 seconds of data at the time point of two minutes, the control circuit 18 controls the motor 19 so as to move the magnetic tape 8 at triple speed (see (b) of FIG. 3). Simultaneously, reading out the data from the memory 4 is started again, the switch 7 is closed, and the data is recorded on the magnetic tape 8. When the amount of the residual data of the memory 4 becomes zero again at the time point of 2 minutes and 15 seconds (refer to FIG. 3 (d)), the control circuit 18 controls the motor 19 so as to stop the running of the magnetic tape 8 whereby reading out the data from the memory 4 is stopped and recording the data on the magnetic tape 8 is interrupted. However, writing the data into the memory 4 is continued without being interrupted.

Until the "program 3" is finished and recording of the data is finished at the time point of 60 minutes and 15 seconds, the steps of waiting for 30 seconds and recording for 15 seconds are repeated.

When recording is finished, information of the recorded state stored in the storage circuit 20 is sent through the bus 27 to the control circuit 18 to be renewed.

As a result of an above-described operation, the recorded state of the magnetic tape 8 becomes as shown in FIG. 2(b), that is, the "program 1" and the "program 2" are recorded sequentially in this order and then, the "program 3" having a length of one hour is recorded on the tape from the tape position C to the tape position D.

Next, control of reading out the data from the memory 4 and control of the tape running by the motor 9 which are effected by the control circuit 18 when recording will be concretely explained below by referring to another example.

Here, it is assumed that the recorded state of the magnetic tape is as shown in FIG. 2(b) and the head 10 is placed in the tape position D. And, a case of newly recording a "program 4" having a length of 1 hour and 30 minutes will be considered. In this case, however, the "program 2" having a length of 30 minutes and already recorded on the tape from the tape position B to the tape position C may be canceled. The control of reading out the data from the memory 4 and the control of the tape running by the motor 19 which are effected by the control circuit 18 will be explained below by referring to FIG. 4.

Figure 4:
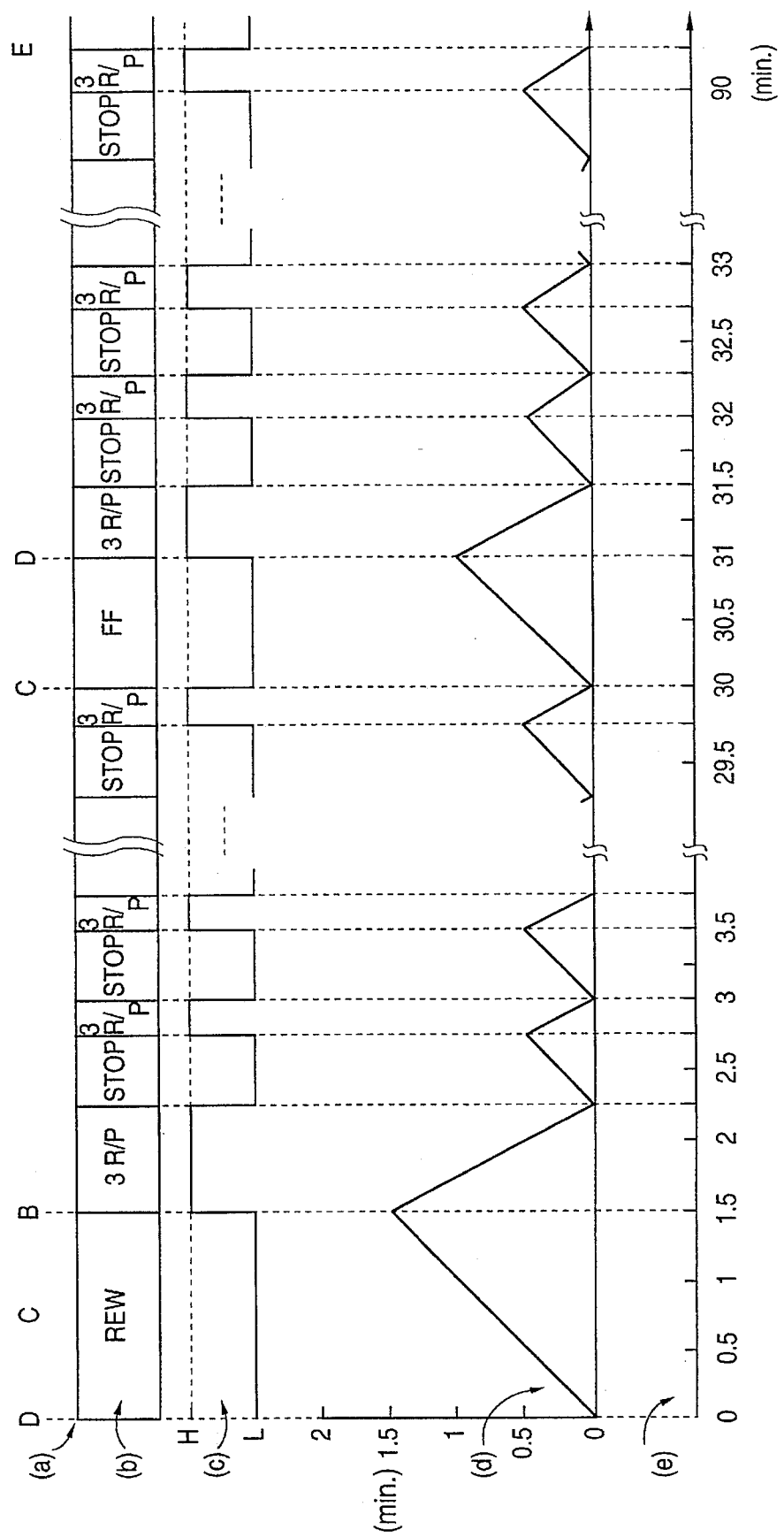
FIG. 4 is a diagram for explaining an operation of the magnetic tape recording/reproducing apparatus according to the first embodiment when recording.

FIG. 4 is a diagram for explaining an operation of the magnetic tape recording/reproducing apparatus as a function of the time so that a time point when recording of the "program 4" is to be recorded is equal to zero. In FIG. 4, (a) shows the tape position at each time correspondingly to FIG. 2(b); (b) shows a tape running state at each time in which "FF" denotes high speed fast forwarding, "REW" denotes high speed rewinding, "STOP" denotes the stoppage of the tape running and "3R/P" denotes triple speed fast forwarding; (c) shows the intermittent reading out state of the memory 4, showing that reading out is carried out at the level "H", and (d) shows the amount of the data stored in the memory 4 but not yet read out therefrom at each time, that is, shows the amount of the residual data of the memory 4 as a function of the time of the video signal. Also, (e) of FIG. 4 shows the time axis.

Here, an indication of canceling the "program 2" having a length of 30 minutes at the zero time point and recording the "program 4" having a length of 1 hour and 30 minutes is sent via the operation panel 16 to the control circuit 18. In this case, the magnetic head 10 is placed in the tape position D. The control circuit 18 refers to the information on the recorded state stored in the storage circuit 20 and controls the motor 19 so as to rewind the magnetic tape at a high speed to the tape position B where the "program 2" that may be canceled is recorded (see (b) of FIG. 4). Furthermore, the control circuit 18 controls the memory 4 so as not to read out the data from the memory 4 up to the time point when the magnetic head arrives at the tape position B (see (c) of FIG. 4) and the switch 7 becomes open. As a result, the recording into the magnetic tape 8 is not performed until the time point when the magnetic head arrives at the tape position B. In this case, the data are sequentially written into the memory 4 (see (d) of FIG. 4). When the tape position arrives at the tape position B at the time point of 1 minute and 30 seconds, the control circuit 18 controls the motor 19 so as to move the magnetic tape 8 at triple speed (see (b) of FIG. 4). In addition, when reading out the data from the memory 4 is started, the switch 7 is closed and the data are recorded on the magnetic tape 8. In this case, writing the data into the memory 4 is always performed at a rate of 5 Mbits/sec. Since reading out is performed at a rate of 15 Mbits/sec, the amount of residual data of the memory 4 becomes zero at the time point of 2 minutes and 15 seconds (see (d) of FIG. 4).

The same operation as in the example shown in FIG. 3 is carried out during the time period until the magnetic tape 8 is run from the time point of 2 minutes and 15 seconds to the time point of 30 minutes when the magnetic tape 8 arrives at the tape position C where the "program 3" is recorded. That is, the tape running and reading out the data from the memory 4 are stopped until the amount of residual data of the memory 4 corresponds to 30 seconds, and recording the data on the magnetic tape is started again when the amount of residual data of the memory 4 corresponds to 30 seconds, and the tape running and reading out the data from the memory 4 are stopped again for writing when the amount of residual data of the memory 4 is equal to zero.

When the magnetic tape 8 arrives at the tape position C where the "program 3" is recorded at the time point of 30 minutes, the control circuit 18 controls the motor 19 so as to feed the magnetic tape 8 at high speed to the tape position D where the recording is possible (see (b) of FIG. 4). Furthermore, the control circuit 18 controls the memory 4 so as to stop reading out the data therefrom up to the time point when the tape position thereof arrives at the tape position D (see (c) of FIG. 4) and the switch 7 becomes open. As a result, recording on the magnetic tape 8 is not performed until the tape position thereof arrives at the tape position D.

When the tape position arrives at the tape position D at the time point of 31 minutes, recording on the magnetic tape 8 is performed until the amount of the residual data of the memory 4 is equal to zero. Then, up to the time point of 90 minutes when recording of the "program 4" is finished, reading out the data from the memory 4 and recording the data into the magnetic tape 8 are repeated. When recording of the "program 4" is finished, the information on the recorded state stored in the storage circuit 20 is sent through the bus 27 to the control circuit 18 for renewal.

As a result of an above-mentioned operation, the recorded state of the magnetic tape 8 becomes as shown in FIG. 2(c); a first half part having a length of 30 minutes of the "program 4" is recorded on the tape from the tape position B to the tape position C where the "program 2" was recorded and a second half part having a length of 60 minutes thereof is recorded thereon from the tape position D to the tape position E.

Figure 5:
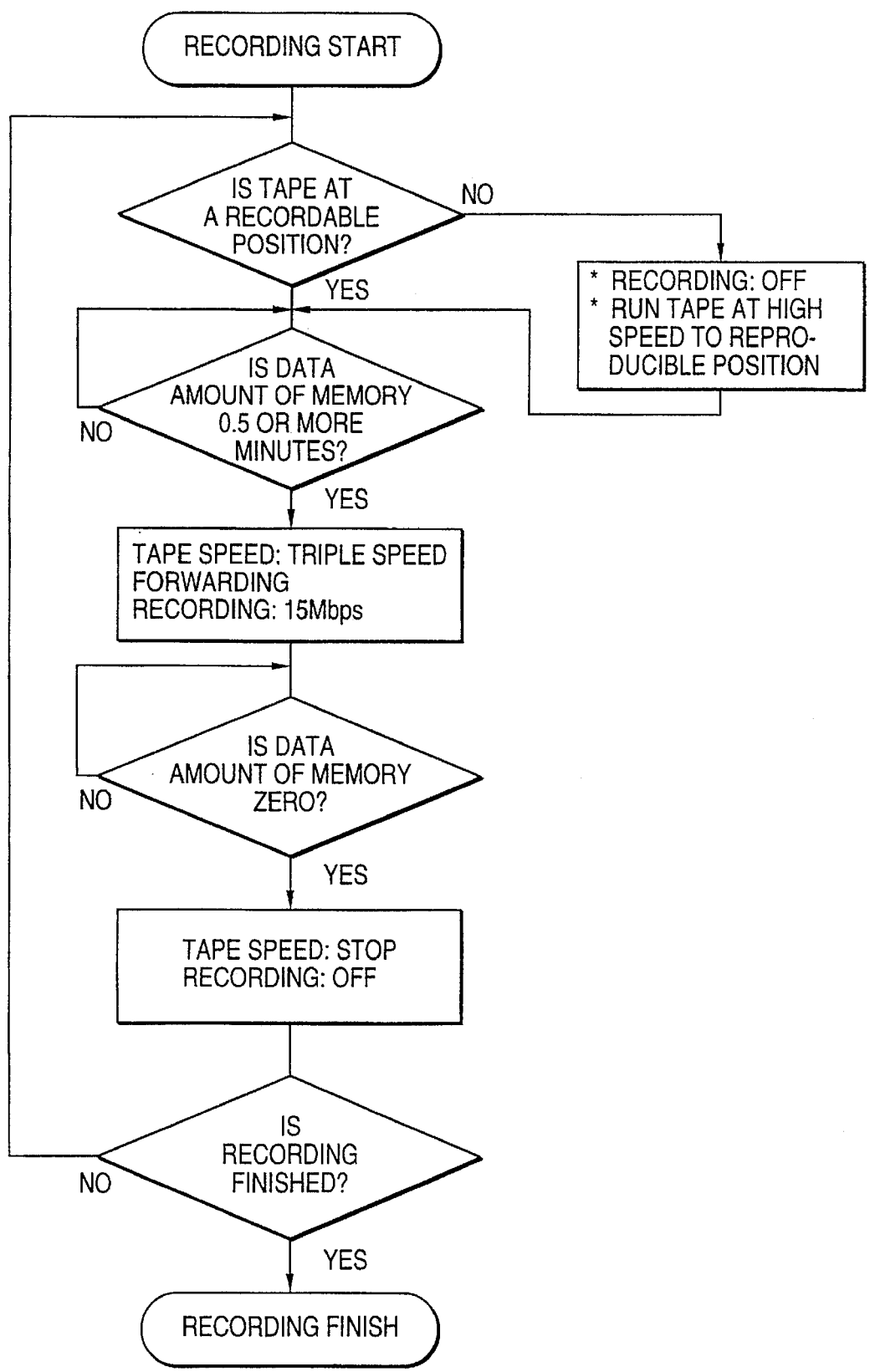
FIG. 5 is a flowchart for explaining an operation of the magnetic tape recording/reproducing apparatus according to the first embodiment when recording.

FIG. 5 is a flowchart for explaining an operation of the magnetic tape recording/reproducing apparatus when recording is controlled by the control circuit 18. In this case, though not shown here, the writing the data into the memory 4 is always executed at a rate of 5 Mbits/sec.

Next, the operation of the magnetic tape recording/ reproducing apparatus according to the first embodiment when reproducing will be described below.

When reproducing information, for example, a name and the like of a program already stored in the storage circuit 20 are sent from the storage circuit 20 through the control circuit 18 and the bus 17 to the operation panel 16 to be displayed. If an operator selects any program to be reproduced, an indication thereof is sent through the bus 17 to the control circuit 18. The control circuit 18 refers through the bus 27 to the information stored in the storage 20 and the switch 21, the switch 5, the memory 4, the switch 7 and the motor 19.

When reproducing, the switch 21 and the switch 5 are controlled in response to the control signal 22 so as to be switched to lower sides. Also, the switch 7 is controlled so as to be always open in response to the control signal 24 and the switch 11 is controlled so as to be always closed in response to the control signal 25. The motor 19 is controlled in response to the control signal 26 from the control circuit 18 so as to make the magnetic tape 8 stop, rewind at a high speed, fast forward at a high speed or fast forward at a triple speed. From the magnetic tape 8, the data are intermittently reproduced through the magnetic head 10 at a rate of 15 Mbits/sec. The reproduction processor 12 identifies the data from reproduced data to be outputted as a signal 13. The signal 13 is sent through the switch 21 to the memory 4. The memory 4 is controlled in response to the control signal 23 from the control circuit 18 so as to write the data intermittently thereinto. The data written into the memory 4 are always read out at a rate of 5 Mbits/sec in the order of being written. The data read out from the memory 4 is sent through the switch 5 to a decoder 14. In the decoder 14, error correction is made in accordance with a synchronization code word, an ID code word, or an error correction code word added when recording and compressed data is decoded to an original video signal and an original audio signal to be outputted as a signal 15.

If the magnetic tape 8 is not placed in the position where an indicated program is recorded, the control circuit 18 controls the motor 19 so as to run the magnetic tape 8 at high speed to a reproducible position and simultaneously, controls the memory 4 so as to stop writing the data therein up to the time point when the magnetic tape 8 arrives at the reproducible position. In addition, if the magnetic tape 8 is placed in the reproducible position, the control circuit 18 controls the memory 4 and the motor 19 so as to reproduce the data from the magnetic tape 8 and write the data into the memory 4 until the amount of residual data stored in but not yet read out from the memory 4 corresponds to 120 seconds from the time point when it became 90 or less seconds of the video and audio signals and sequentially controls them so as to stop the tape running and writing the data into the memory 4 until the amount of residual data stored in the memory 4 is reduced to that of 90 seconds from the time point when the amount thereof was equal to 120 seconds.

Next, control of reading out the data from the memory 4 and control of the tape running by the motor 19 which are effected by the control circuit 18 will be more concretely explained below.

Figure 6:
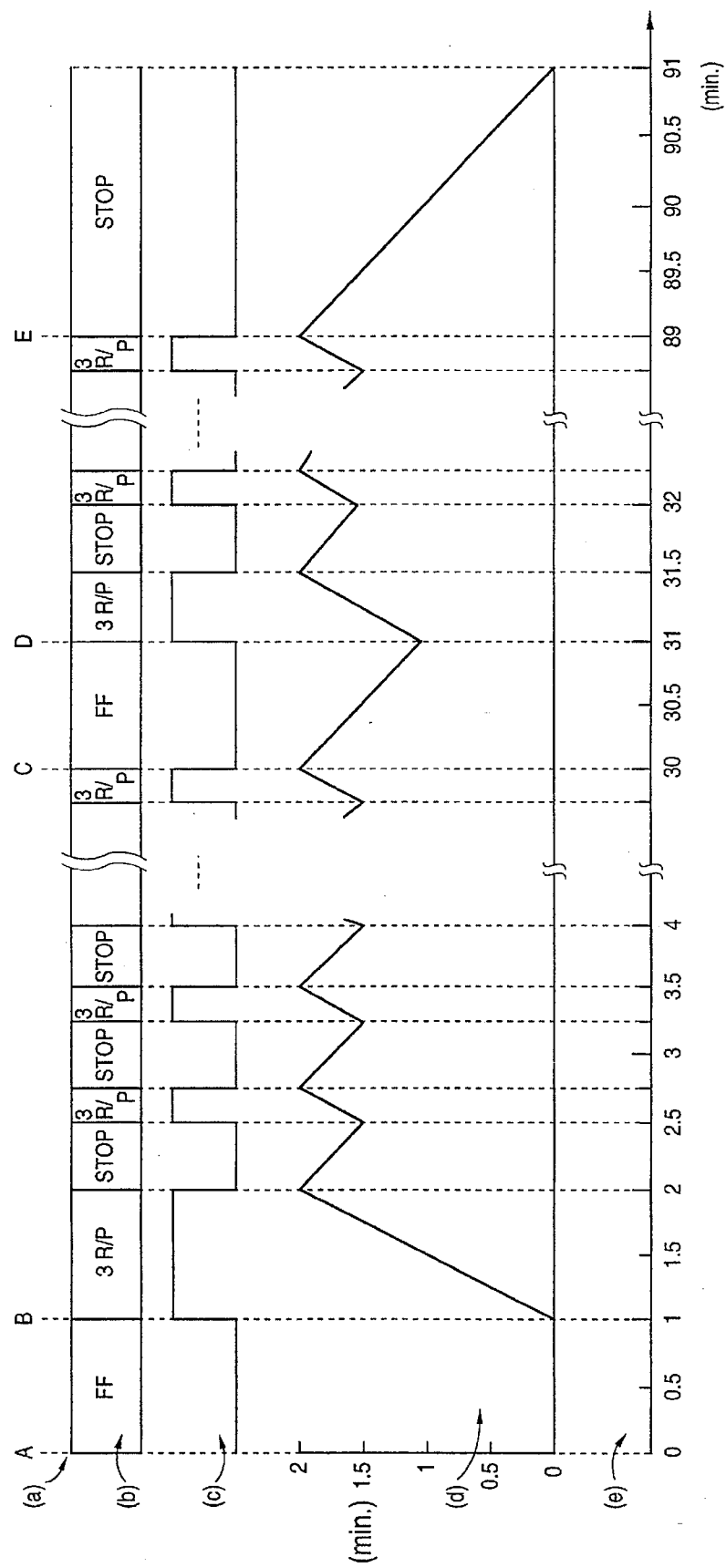
FIG. 6 is a diagram for explaining an operation of the magnetic tape recording/reproducing apparatus according to the to the to the first embodiment when reproducing.

Here, it is supposed that the recorded state of the magnetic tape is made as shown in FIG. 2(c). That is, the "program 1"

having a length of 30 minutes is recorded on the magnetic tape from the tape position A to the tape position B and the "program 3" having a length of one hour is recorded into the magnetic tape from the tape position C to the tape position D. Also, a first half part for 30 minutes of the "program 4" having a length of 1 hour and 30 minutes is recorded on the tape from the tape position B to the tape position C and a second half part of one hour thereof is recorded on the magnetic tape from the tape position D to the tape position E. In this case, the magnetic head 10 is supposed to be placed in the tape position A to reproduce the "program 4" having a length of 1 hour and 30 minutes. Here, the control of writing the data into the memory 4 and control of the tape running by the motor 19 which are effected by the control circuit 18 will be explained below by referring to FIG. 6 which shows an operation of the magnetic tape recording/reproducing apparatus as a function of the time where time point when reproducing the "program 4" is indicated is to be zero. In which, (a) of FIG. 6 shows the tape position at each time correspondingly to the case shown in FIG. 2 (c); (b) of FIG. 6 shows the tape running state in which "FF" denotes the high speed fast forwarding; "STOP" denotes the stoppage of running of the magnetic tape and "3R/P" denotes the triple speed fast forwarding; (c) of FIG. 6 shows the intermittent writing state into the memory 4, which is executed at the time point of "H", and (d) of FIG. 6 shows the amount of the data stored in the memory 4 but not yet read out therefrom until the time point "H" arrives, that is, shows the amount of residual data of the memory 4 as a function of the time of the video signal. Also, (e) of FIG. 6 shows the time axis.

Here, the indication for reproducing the "program 4" at the time point of zero is sent from the operation panel 16 to the control circuit 18. In this case, the magnetic head 10 is placed in the tape position A. The control circuit 8 refers to the information stored in the storage circuit 20 and controls the motor 19 so as to move the magnetic tape 8 at high speed to the tape position B where the first half of the "program 4" is recorded (see (b) of FIG. 6). Furthermore, the control circuit 18 controls the memory 4 so as not to have the data written therein up to the time point when the tape position arrives at B (see (c) of FIG. 6). If the tape position arrives at the tape position B at the time point of 1 minute, the control circuit 18 controls the motor 19 so as to move the magnetic tape 8 at triple speed (see (b) of FIG. 6). Furthermore, the control circuit 18 controls the memory 4 so as to write into the memory 4 the data having a rate of 15 Mbits/sec to be reproduced from the magnetic tape 8 through the magnetic head 10, the switch 11 and the reproduction processor 12 (see (c) of FIG. 6). The data are read out always at a rate of 5 Mbits/sec from the memory 4 in the order that it was written in. As a result, the reproduced data of the "program 4" are read out since the time point of 1 minute and sent through the switch 5 to the decoder 14 to be decoded to obtain the reproduced video and audio signals. The reproduced video and audio signals thus obtained are sequentially outputted as a signal 15. In addition, the writing of the reproduced data into the memory 4 is at triple the speed of that used for writing, namely, at a rate of 15 Mbits/sec, so that the amount of residual data of the memory 4 corresponds to 2 minutes of data at the time point of 2 minutes (see (d) of FIG. 6).

When the amount of the residual data of the memory 4 corresponds to two minutes of data at the time point of 2 minutes, the control circuit 18 controls the motor 19 so as to stop the running of the magnetic tape 8 (see (b) of FIG. 6). Also, the writing the data into the memory 4 is stopped (see (c) of FIG. 6). Furthermore, reading out the data from the memory 4 is continued without being interrupted at a rate of 5 Mbits/sec. Since writing the data into the memory 4 is not effected after the time point of 2 minutes and only reading out the data from the memory 4 is effected, the amount of residual data of the memory 4 is reduced (see (d) of FIG. 6).

When the amount of residual data of the memory 4 corresponds to one minute and 30 seconds of data at the time point of 2 minutes and 30 seconds, the control circuit 18 controls the motor 19 so as to move the magnetic tape 8 again at triple speed (see (b) of FIG. 6). Simultaneously, writing of the data into the memory 4 is started again. When the amount of residual data of the memory 4 corresponds to two minutes of data at the time point of 2 minutes and forty-five seconds (see (d) of FIG. 6), the control circuit 18 controls the motor 19 so as to stop the running of the magnetic tape 8 again so as to thereby interrupt the writing of the data into the memory 4.

Thereafter, up to the time point of 30 minutes when the magnetic tape 8 arrives at the tape position C where the first half part of the "program 4" is finished, writing the data into the memory 4 for 15 seconds and waiting for 30 seconds are repeated. Reading the data from the memory 4 is always executed.

When the magnetic tape 8 arrives at the tape position C where the first half part of the "program 4" is finished at the time point of 30 minutes, the control circuit 18 controls the motor 19 so as to refer to the information on the recorded state of the cartridge 9 stored in the storage circuit 20 so as to thereby feed the magnetic tape 8 at high speed up to the tape position D where the second half part of the "program 4" is recorded (see (b) of FIG. 6). Also, the control circuit 18 controls the memory 4 so as to stop writing the data into the memory 4 up to the time point when the tape position arrives at the tape position D (see (c) of FIG. 6).

When the tape position arrives at the tape position D the time point of 31 minutes, reproduction of the data from the magnetic tape 8 occurs until the amount of the residual data of the memory 4 corresponds to 2 minutes of data. Thereafter, waiting and reproduction are repeated again until the magnetic tape 8 arrives at a tape position E at the time point of 89 minutes. If the magnetic tape 8 arrives at the tape position E where recording the "program 4" is finished at the time point of 89 minutes, after that time point, only reading out the data from the memory 4 is carried out, and the amount of residual data of the memory 4 becomes equal to zero at the time point of 91 minutes and the reproduction of the "program 4" is finished.

Figure 7:
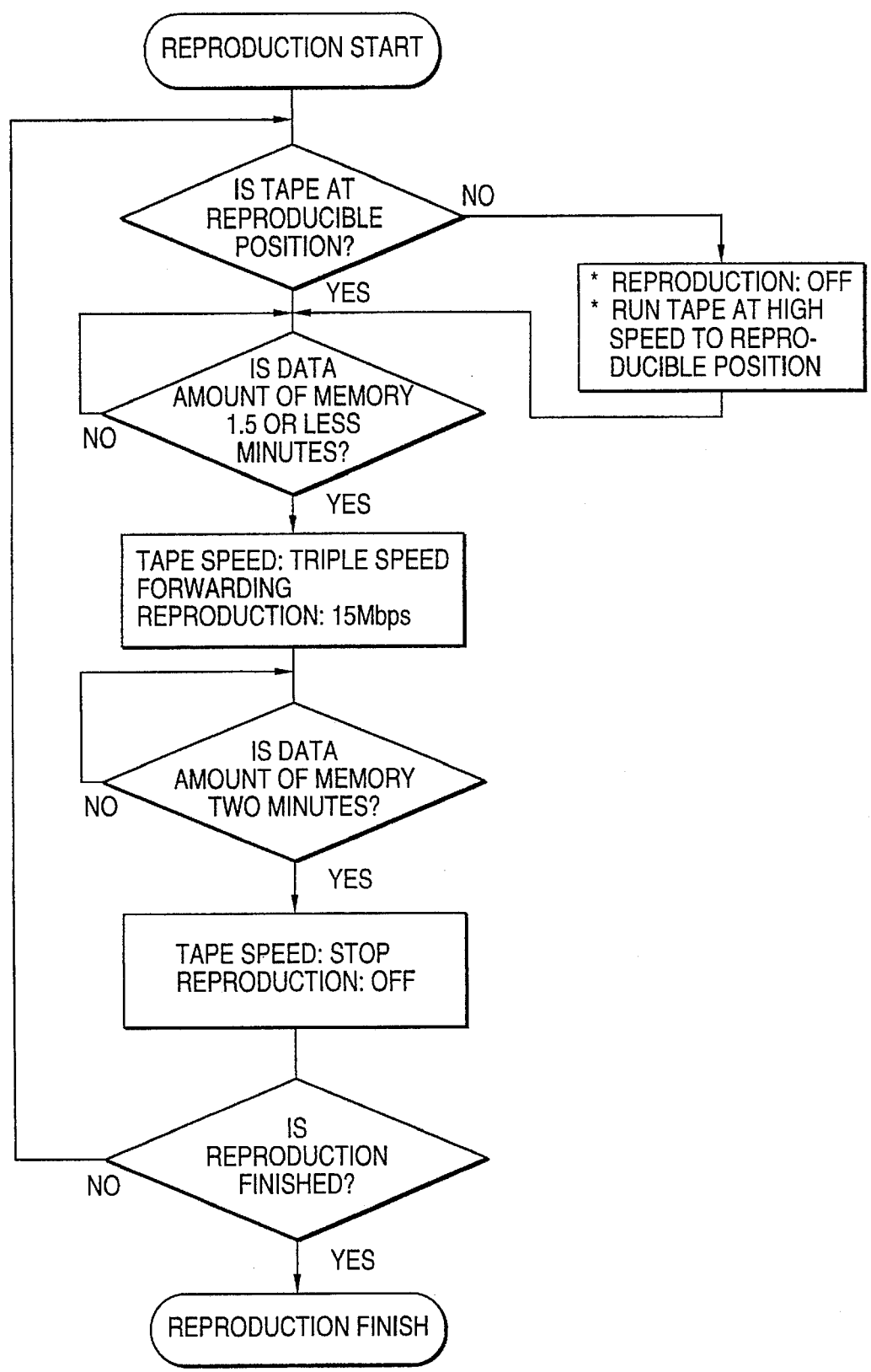
FIG. 7 is a flowchart for explaining an operation of the magnetic tape recording/reproducing apparatus according to the first embodiment when reproducing.

Furthermore, the operation of the magnetic tape recording/reproducing apparatus when reproducing which is controlled by the control circuit 18 is shown in FIG. 7 in a form of a flowchart. Here, not shown in FIG. 7, reading out the data from the memory 4 is always effected at a rate of 5 Mbits/sec during reproduction.

As explained above, the apparatus according to this embodiment offers a larger number of advantages than would be obtained with the conventional VTR.

First, when recording, operations such as rewinding and fast forwarding of the magnetic tape 8 within the tape cartridge 9 in order to make an access to any recordable position are all not needed. These operations are controlled by the control circuit 18 in accordance with the information on the recorded state stored in the storage circuit 20.

Also, waiting time in order to effect access to any range where recording is possible is not needed, so that even in the rapid recording case, the program can be recorded from its beginning. This can be realized in such a manner that the data are held in the memory 4 during rewinding or fast forwarding and recording the data on the magnetic tape 8 is carried out at a higher speed than a rate of the audio and video signals. Here, the storage capacity of the memory 4 is such that two minutes of video signals and audio signals can be stored. On the other hand, the magnetic tape 8 can arrive at an arbitrary position from any other arbitrary position within 90 seconds. As a result, irrespective of the position of the magnetic tape 8, is placed in any position, recording can be performed from the time point when recording is demanded.

This can be realized in such a manner that the storage capacity of the memory 4 is Q·T or more bits when the data has a data rate of Q bits/sec (in this embodiment, Q=5×10$^6$) and the magnetic tape can arrive at an arbitrary position from any other arbitrary position within T seconds (in this embodiment, T=90 seconds).

Furthermore, one program is not necessarily recorded at sequential positions on the magnetic tape 8. As a result, all parts of the magnetic tape 8 can be effectively utilized. This can be realized in such a manner that the amount of residual data of the memory 4 is controlled so as not to exceed 30 seconds when recording through the memory 4. That is, the memory 4 has a storage capacity at least for 90 seconds, so that even when the magnetic tape 8 is moved to an arbitrary position, the data can be held without being interrupted.

Next, even when reproducing, the rewinding and fast forwarding to access a desired program which has already been recorded are not needed.

Figure 8:
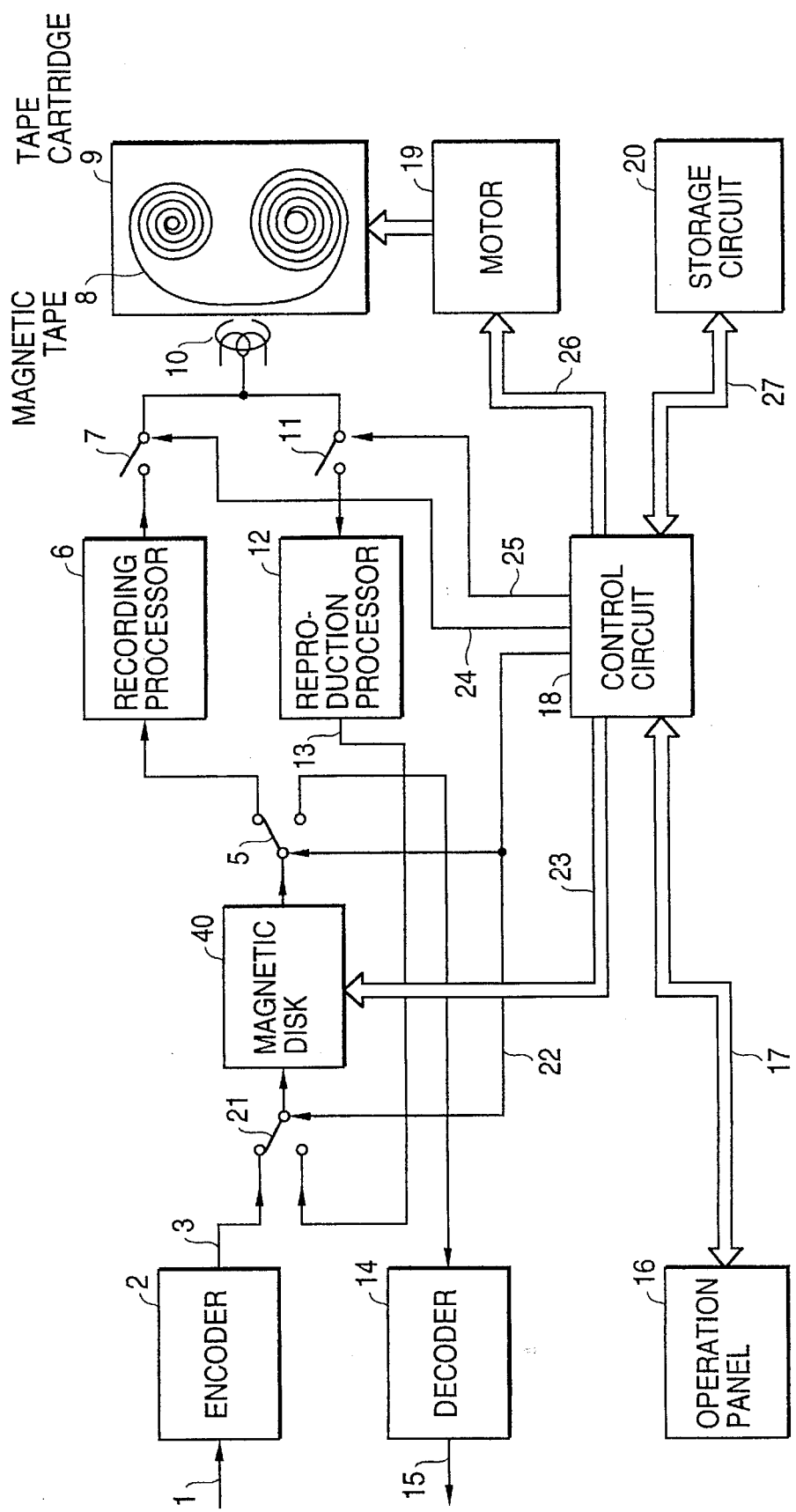
FIG. 8 is a block diagram of a magnetic recording/ reproducing apparatus according to an another example according to the first and second embodiments of this invention.

Furthermore, there is no need to rewind and fast forward, which means that one tape cartridge can record for a long period of time (in this embodiment, 200 hours). Accordingly, an exchange of cartridges is not needed in any case. As a result, there is no need to look for a recordable cassette when recording or to look for the cassette having the desired program recorded thereon when reproduction is desired. Furthermore, the memory 4 may be a semiconductor memory, but is not limited thereto, and it may be a magnetic disk 40 as shown in FIG. 8. As a result, a memory having a larger capacity can be easily realized as compared with the case of using the semiconductor memory. Furthermore, memories other than a semiconductor memory and a magnetic disk can be used for this purpose.

Next, a second embodiment of this invention will be described below, which is the same in structure as the first embodiment shown in FIG. 1, but different in operation therefrom. First, an operation of the apparatus of the second embodiment when recording will be explained. When recording, a recording indication is sent from the operation panel 16 to the control circuit 18 through the bus 17. The control circuit 18 refers to the information stored in the storage circuit 20 described later through the bus 27 and controls the switch 21, the switch 5, the memory 4, the switch 7 and the motor 19.

The video and audio signals to be recorded are digitized and sent to the encoder 2 as the signal 1. The encoder 2 data-compresses the signal 1 to reduce the amount of information and simultaneously, adds the error correction code word, the synchronization code word and the identification (ID) code word and outputs the signal 3. The data rate Q bits/sec of the signal 3 is supposed to be 5 Mbits/sec (Q =5×10$^6$) in this case. The switch 21 is switched to the upper side when recording in response to the control signal 22 from the control circuit 18. As a result, the signal 3 is sent to the memory 4. The memory 4 is a semiconductor memory (first-in first-out memory: FIFO memory) which can read out the data in the order in which it was written in and simultaneously execute the writing and the reading out asynchronously. Also, the memory 4 has a capacity for storing video and audio signals compressed to 5 Mbits/sec for 90 seconds. The memory 4 is controlled in response to the control signal 23 from the control circuit 18 and always receives the signal 3 at a rate of 5 Mbits/sec sequentially. On the other hand, from the memory 4, the data are read out in the order in which it was written in at the same rate as in writing, 5 Mbits/sec, or at a higher rate, 15 Mbits/sec, than that used when writing. The switch 5 is always switched to the upper side when recording in response to the control signal 22 from the control circuit 18. As a result, the data read out from the memory 4 is supplied to the recording processor 6. The recording processor 6 modulates the data read out from the memory 4. The switch 7 is controlled in response to the control signal 24 from the control circuit 18 and closed only during the time period when the data are being read out from the memory 4. As a result, the data read out from the memory 4 and modulated by the recording processor 16 are supplied to the magnetic head 10.

On the other hand, the tape cartridge 9 houses the magnetic tape 8 and has a size approximately equal to a cassette for VHS-VTR use. Also, the magnetic tape 8 has a recording density of about 1 bit/μm$^2$. As a result, the tape cartridge 9 makes it possible to record video and audio signals compressed to 5 Mbits/sec for about 200 hours. The running of the magnetic tape is driven by the motor 19. The motor 19 is controlled in response to the control signal 26 from the control circuit 18 in order to make the magnetic tape 8 stop, rewind at high speed, forward at high speed, forward at triple speed when recording or reproducing at a rate of 15 Mbits/sec or forward at the normal speed when recording or reproducing at a rate of 5 Mbits/sec. In the case of high speed forwarding or high speed rewinding, the magnetic tape 8 can be moved from an arbitrary position to any other arbitrary position within a time period of T seconds (in this embodiment, T=90). The memory 4 has a capacity capable of storing video and audio signals compressed to 5 Mbits/sec as shown above for 90 seconds, having a storage capacity equal to Q·T bits.

In this case, during the time period that the data are being read out at a rate of 5 Mbits/sec from the memory 4, the magnetic tape 8 is moved normally and the data are supplied to the magnetic head 10 to be recorded at a rate of 5 Mbits/sec. On the one hand, during the time period when the data are being read out at a rate of 15 Mbits/sec from the memory 4, the magnetic tape 8 is moved at triple speed and the data are recorded through the magnetic head 10 at a rate of 15 Mbits/sec. On the other hand, during the time period when the data are not being read out from the memory 4, the switch 7 is open in response to the control signal 24 from the control circuit 18, so that recording is not executed. Also, in such a time period, the magnetic tape 8 is stopped, forwarded at high speed or rewound at high speed.

If the magnetic tape 8 is not in the recordable position, the control circuit 18 controls the motor 19 so as to run the magnetic tape 8 at high speed to the recordable position and simultaneously, controls the memory 4 and the switch 7 so as to stop reading out the data from the memory 4 and recording the data on the magnetic tape 8 until the magnetic tape 8 arrives at the recordable position. Also, if the magnetic tape 8 is in the recordable position, the control circuit 18 controls the memory 4, the motor 19 and the switch 7 so as to read out the data from the memory 4 to record the data on the magnetic tape 8 at a rate of 15 Mbits/sec until the residual amount of data stored in the memory 4 becomes zero excepting a case in which it already is equal to zero, and when the amount of the residual data of the memory 4 is already equal to zero, controls the memory 4, the motor 19 and the switch 7 so as to read out the data from the memory 4 to record the data on the magnetic tape 8 at a rate of 5 Mbits/sec.

The readout control from the memory 4 and the tape running control of the motor 19 which are effected by the control circuit 18 are explained below in detail.

Here, the recording on the magnetic tape 8 is supposed to be shown in FIG. 2(b), that is, the "program 1" having a length of 30 minutes is recorded on the tape from the tape position A to the tape position B, the "program 2" having a length of 30 minutes is recorded thereon from the tape position B to the tape position C and the "program 3" is recorded thereon from the tape position C to the tape position D and after the tape position D, no data is recorded.

Such recorded states of the magnetic tape 8 in the tape cartridge 9 as shown above, that is, information as to whether or not any tape position has the data recorded thereon and the name of the program thereof, if it has already been recorded, are stored in the storage circuit 20 shown in FIG. 1. The contents of the storage circuit 20 are referred to or renewed by the control circuit 18 through the bus 27. Out of the contents of the storage circuit 20, the information such as the name of the program which has already been recorded and the recordable time are displayed on the operation panel 16 and through the bus 27, the control circuit 18 and the bus 17.

Figure 9:
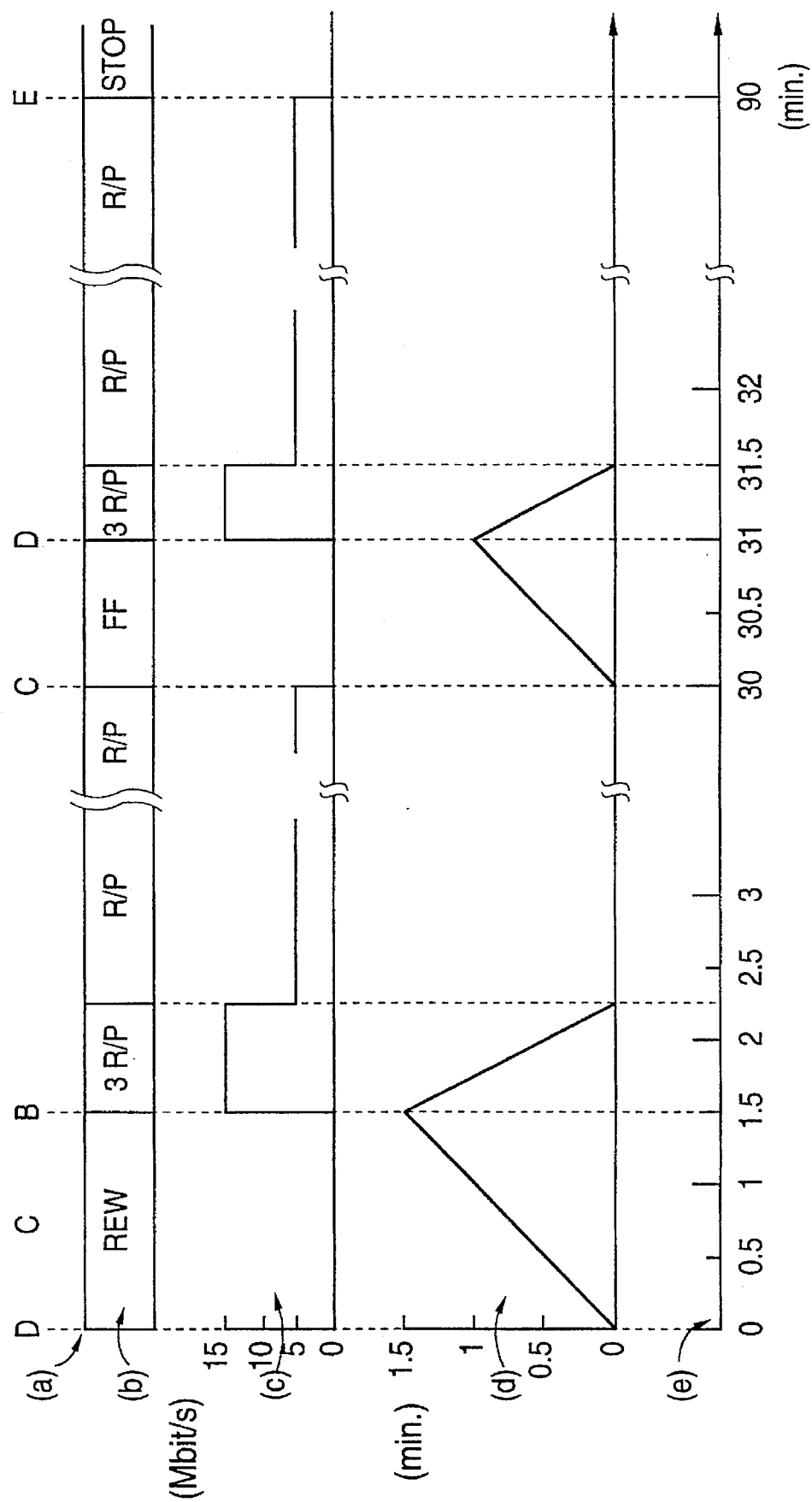
FIG. 9 is a diagram for explaining an operation of the magnetic tape recording/reproducing apparatus according to the second embodiment when recording.

Then, it is assumed that the recorded state of the magnetic tape is as shown in FIG. 2(b) and the magnetic head 10 is placed in the tape position D. Here, the case in which a "program 4" having a length of one hour and 30 minutes is to be newly recorded will be considered. In this case, however, the "program 2" having a length of 30 minutes already recorded on the tape from the tape position B to the tape position C may be cancelled. The reading out control of the memory 4 and the tape running control by the motor 19 which are effected by the control circuit 18 will be explained below by referring to FIG. 9. FIG. 9 is a diagram for explaining the operation of the magnetic tape recording/reproducing apparatus as a function of the time with the time when the "program 4" is indicated as zero. In FIG. 9, (a) shows the tape position at each time correspondingly to the case shown in FIG. 2(b) and (b) shows the tape running state at each time in which "FF" denotes high speed forwarding, "REW" denotes high speed rewinding, "STOP" denotes stoppage, "3R/P" denotes triple speed forwarding and "R/P" denotes normal forwarding. (c) of FIG. 9 shows the readout speed from the memory 4. (d) of FIG. 9 shows the amount of data stored in the memory 4 but not yet read out therefrom up to the time point, that is, the amount of the residual data of the memory 4 as a function of the time of an audio signal, and (e) of FIG. 9 shows the time axis.

Here, the indication that the "program 2" having a length of 30 minutes is cancelled at the time point of zero and the "program 4" having a length of one hour and 30 minutes is recorded is sent from the operation panel 16 to the control circuit 18. At that time, the magnetic head 10 is placed in the tape position D. The control circuit 18 refers to the information on the recorded state stored in the storage circuit 20 and controls the motor 19 so as to feed the magnetic tape 8 at high speed up to the tape position B where the "program 2" that may be cancelled (see (b) of FIG. 9). Also, the control circuit 18 controls the memory 4 so as not to read out the data from the memory 4 up to the time point when the tape position arrives at the tape position B (see (c) of FIG. 9) and the switch 7 is made open. As a result, the recording into the magnetic tape 8 is not executed during this time period. In addition, the recorded data are written into the memory 4 sequentially (see (d) of FIG. 9). When the tape position arrives at B at the time point of 1 minute and 30 seconds, the control circuit 18 controls the motor 19 so as to feed the magnetic tape 8 at triple speed (see (b) of FIG. 9). Also, reading out of the data from the memory 4 is started at a rate of 15 Mbits/sec and the switch 7 is closed to record the data into the magnetic tape 8. The amount of the residual data of the memory 4 becomes zero at the time point of 2 minutes and 15 seconds (see (d) FIG. 9).

From the time point of 2 minutes and 15 seconds, the control circuit 18 controls the motor 19 so as to feed the magnetic tape 8 normally (see (b) of FIG. 9), and simultaneously controls the memory 4 so as to read out the data at a rate of 5 Mbits/sec which is the same as in writing and recording of the data into the magnetic tape 8. Since the writing and reading out of the data into and from the memory 4 are equal in speed, the amount of the residual data of the memory 4 always becomes zero (see (d) of FIG. 9). When the magnetic tape 8 arrives at the tape position C where the "program 3" is being recorded at the time point of 30 minutes, the control circuit 18 controls the motor 19 so as to feed the magnetic tape 8 at high speed up to the tape position D which is recordable (see (b) of FIG. 9). Also, the control circuit 18 controls the memory 4 so as to stop reading out of the data therefrom (see (c) of FIG. 9) until the tape position arrives at D and the switch 7 so as to be made open. As a result, during this time period, the recording into the magnetic tape 8 is not executed.

When the tape position arrives at D at the time point of 31 minutes, the control circuit 18 controls the motor 19, the memory 4 and the switch 7 so as to feed the magnetic tape 8 at triple speed (see (b) of FIG. 9) and read out the data from the memory 4 at a rate of 15 Mbits/sec (see (c) of FIG. 9) to be recorded into the magnetic tape 8.

When the amount of the residual data of the memory 4 becomes zero at the time point of 31 minutes and 30 seconds (see (d) of FIG. 9), the control circuit 18 controls the motor 19 so as to feed the magnetic tape 8 at the normal speed again up to the time point when recording the "program 4" is finished (see (b) of FIG. 9) and simultaneously controls the memory 4 so as to read out the data therefrom at a rate of 5 Mbits/sec to be recorded into the magnetic tape 8. When recording the "program 4" is finished, the information on the recorded state stored in the storage circuit 20 is sent through the bus 27 to the control circuit 18 to be renewed.

Consequently, the recorded state of the magnetic tape 8 becomes as shown in FIG. 2(c), that is, a first half part for 30 minutes of the "program 4" is recorded into the tape from the tape position B to the tape position C and a second half part for 60 minutes thereof is recorded thereinto from the tape position D to the tape position E.

Figure 10:
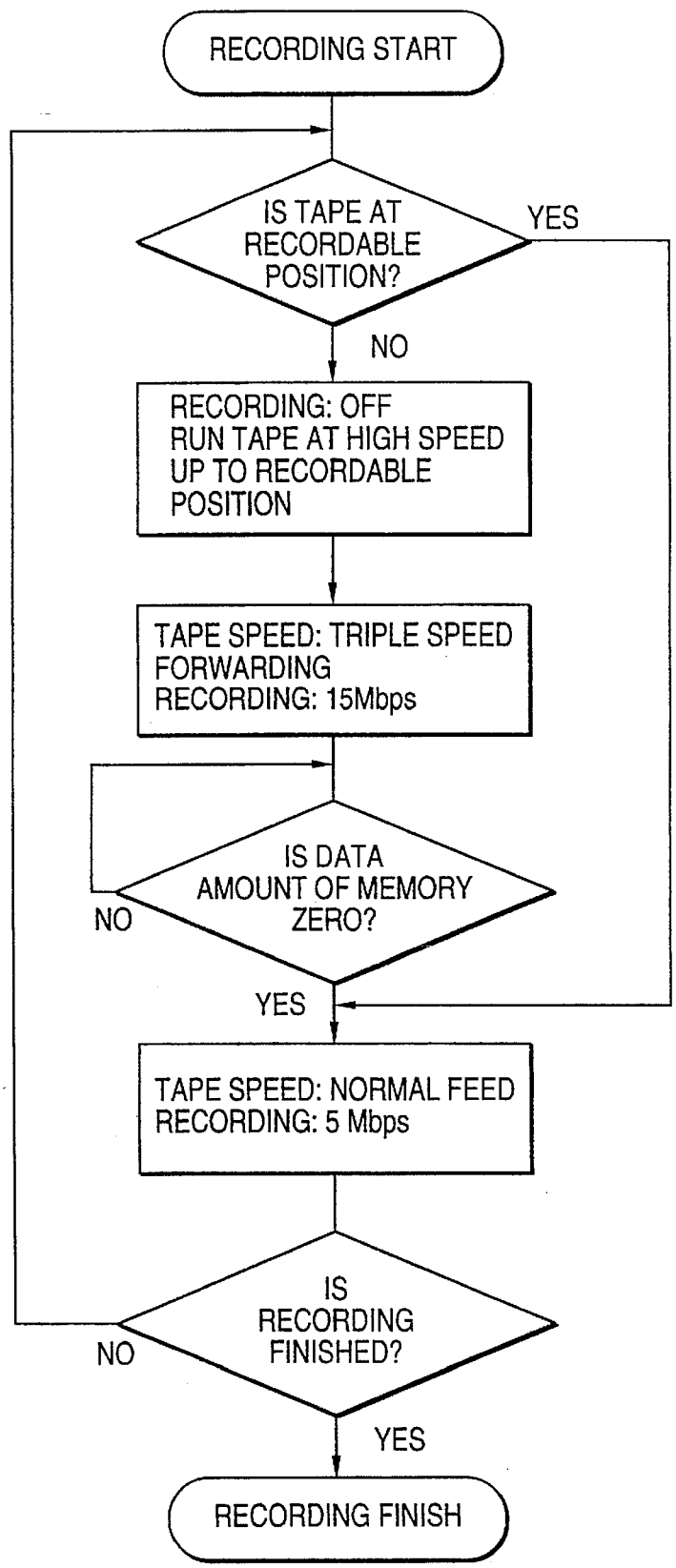
FIG. 10 is a flowchart for explaining an operation of the magnetic tape recording/reproducing apparatus according to the second embodiment when recording.

A flow diagram of the above mentioned operation of the apparatus of the second embodiment when recording controlled by the control circuit 18 is schematically shown in FIG. 10. Here, though not shown in FIG. 10, writing the data into the memory 4 is executed always at a rate of 5 Mbits/sec during recording.

Hereafter, the operation of the apparatus of the second embodiment when reproducing will be described.

When reproducing, the information on the already stored program name and the like of the contents of the storage circuit 20 are displayed on the operation panel 16 through the bus 27, the control circuit 18 and the bus 17. When an operator selects the program intended to be reproduced from the operation panel 16, the indication of the operator is sent through the bus 17 to the control circuit 18. The control circuit 18 refers to the information stored into the storage circuit 20 through the bus 27 and controls the switch 21, the switch 5, the memory 4, the switch 7 and the running control circuit 19.

When reproducing, the switches 21 and 5 are switched to the lower side, respectively, in response to the control signal 22 from the control circuit 18. Also, the switch 7 is controlled to be always open and the switch 11 is controlled to be always closed in response to the control signal 24 and control signal 25 from the control circuit 18, respectively. Furthermore, the motor 19 is controlled in response to the control signal 26 from the control circuit 18 so as to stop, rewind at high speed, feed at high speed, feed at triple speed or normally feed the magnetic tape 8. The data are reproduced from the magnetic tape 8 through the magnetic head 10 at a rate of 5 Mbits/sec or 15 Mbits/sec. The reproduced data are sent through the switch 11 to the reproduction processor 12. The reproduction processor 12 identifies the data from the reproduced signal and the data thus identified are outputted as the signal 13.

The signal 13 is sent through the switch 21 to the memory 4. The memory 4 is controlled in response to the control signal 23 from the control circuit 18 to write the reproduced data thereinto. The data written into the memory 4 are read out therefrom always at a rate of 5 Mbits/sec in the order of being written. The data read out from the memory 4 are sent through the switch 5 to the decoder 14. In the decoder 14, the error correction is made in accordance with the synchronization code word, ID code word or the error correction code word added when recording and at the same time, the compressed data are decoded to the original video signal and audio signal to be outputted as the signal 15.

In the case where the magnetic tape 8 is not placed in the position where the indicated program is recorded, the control circuit 18 controls the motor 19 so as to run the magnetic tape 8 at high speed up to the reproducible position and the memory 4 so as to stop writing the reproduced data into the memory 4 until the magnetic tape 8 arrives at the reproducible position. Also, in the case where the magnetic tape 8 is placed in the reproducible position, the control circuit 18 controls the memory 4 and the motor 19 so that when the amount of the residual data stored into but not yet read out from the memory 4 is less than for 90 seconds, the data are reproduced from the magnetic tape 8 at a rate of 15 Mbits/sec until the amount of the residual data becomes for 90 seconds and written into the memory 4 and when the amount of the residual data of the residual data stored into the memory 4 is for 90 seconds, the data are reproduced from the magnetic tape 8 at a rate of 5 Mbits/sec and written into the memory 4.

The writing control into the memory 4 and the tape running control by the motor 19 which are effected by the control circuit 18 will be further concretely explained below.

Now, the recorded state of the magnetic tape is assumed to be as shown in FIG. 2(c). That is, the "program 1" having a length of 30 minutes is recorded into the tape from the tape position A to the tape position C and the "program 3" having a length of one hour is recorded into the tape from the tape position C to the tape position D. Also, the "program 4" having a length of one hour and 30 minutes has the first half part for 30 minutes recorded into the tape from the tape position B to the tape position C and the second half part for one hour recorded thereinto from the tape position D to the tape position E. Furthermore, it is assumed that the head 10 is placed in the tape position A and the "program 4" having a length of 1 hour and 30 minutes is to be reproduced. The writing control into the memory 4 and the tape running control by the motor 19 which are effected by the control circuit 18 will be explained below.

Figure 11:
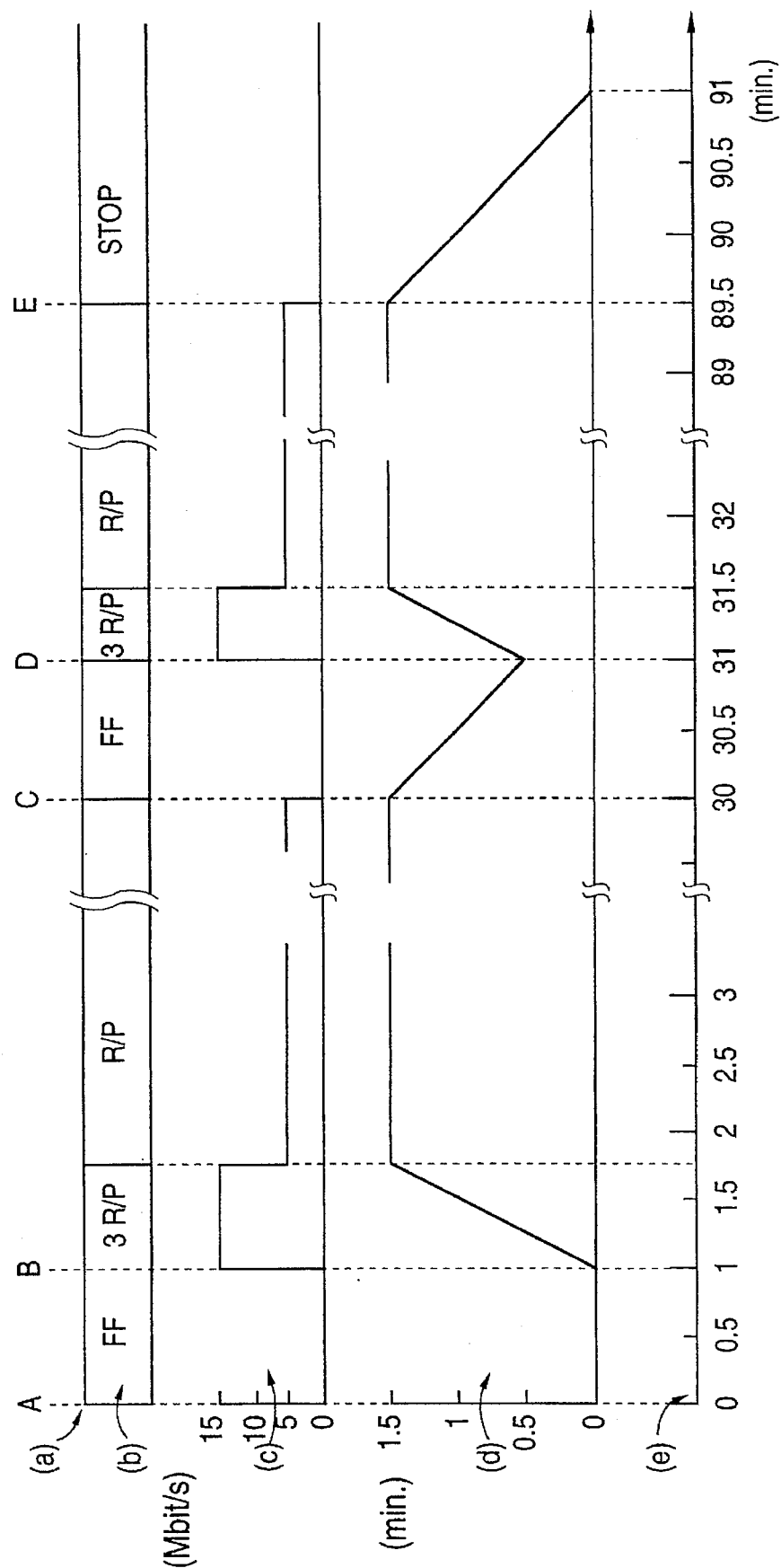
FIG. 11 is a diagram for explaining an operation of the magnetic tape recording/reproducing apparatus according to the second embodiment when reproducing.

FIG. 11 is a diagram for explaining an operation as a function of time, in which the time point when the "program 4" is indicated to be reproduced is made zero. In FIG. 11, (a) shows the tape position at each time correspondingly to the case shown in FIG. 2(c), and (b) of FIG. 11 shows the tape running state at each time, in which "FF" denotes high speed forwarding, "STOP" denotes stoppage, "3R/P" denotes triple speed forwarding and "R/P" denotes normal forwarding. (c) of FIG. 11 shows the writing speed of the data into the memory 4. (d) of FIG. 11 shows the amount of the data stored into the memory 4 but not yet read out therefrom until the time point arrives, that is, showing the amount of the residual data of the memory 4 as a function of the time of the audio signal. (e) of FIG. 11 shows the time axis.

Here, the indication of reproducing the "program 4" is sent from the operation panel 16 to the control circuit 18 at the time point of zero. At that time, the magnetic head 10 is placed in the tape position A. The control circuit 18 refers to the information on the recorded state of the magnetic tape 8 stored in the storage circuit 20 and controls the motor 19 so as to feed the magnetic tape 8 at high speed up to the tape position B where the first half part of the "program 4" is recorded (see (b) of FIG. 11). Furthermore, the control circuit 18 controls the memory 4 so as not to write the data into the memory 4 until the tape position arrives at B (see (c) of FIG. 11). When the tape position arrives at B at the time point of one minute, the control circuit 18 controls the motor 19 so as to feed the magnetic tape 8 at triple speed (see (b) of FIG. 11). Also, the control circuit 4 controls the memory 4 so as to write the data reproduced from the magnetic tape 8 at a rate of 15 Mbits/sec thereinto through the magnetic head 10, switch 11 and the reproduction processing circuit 12 (see (c) of FIG. 11). From the memory 4, the data are always read out at a rate of 5 Mbits/sec in the order of being written. As a result, the reproduced data of the "program 4" are read out since the time point of one minute and the video and audio signals reproduced through the switch 5 and decoder 14 are sequentially outputted as the signal 15. Also, the writing of the reproduced data into the memory 4 is carried out at a rate of 15 Mbits/sec which is triple that when reading out therefrom, so that the amount of the residual data of the memory 4 at the time point of 1 minute and 45 seconds becomes for one minute and 30 seconds (see (d) of FIG. 11).

When the amount of the residual data of the memory 4 becomes for 1 minute and 30 seconds at the time point of 1 minute and 45 seconds, the control circuit 18 controls the motor 19 so as to feed the magnetic tape 8 normally (see (b) of FIG. 11). Also, the control circuit 18 controls the memory 4, so as to write the reproduced data from the magnetic tape 8 thereinto at a rate of 5 Mbits/sec (see (c) of FIG. 11).

After the time point of 2 minutes, the writing and reading out of the data into and from the memory 4 are made simultaneously and as a result, the amount of the residual data of the memory 4 always becomes for 1 minute and 30 seconds ((d) of FIG. 11).

When the magnetic tape 8 arrives at the tape position C where recording the first half part of the "program 4" is finished at the time point of 30 minutes, the control circuit 18 refers to the information on the recorded state of the cartridge 9 stored into the storage circuit 20 and controls the motor 19 so as to feed the magnetic tape 8 at high speed up to the tape position D where the second half part of the "program 4" is recorded (see (b) of FIG. 11). Also, the control circuit 18 controls the memory 4 so as to stop writing the data thereinto until the tape position arrives at D (see (c) of FIG. 11). Accordingly, the amount of the residual data of the memory 4 is reduced (see (d) of FIG. 11).

When the tape position arrives at D at the time point of 31 minutes, the control circuit 18 controls the motor 19 so as to feed the magnetic tape 8 at triple speed until the amount of the residual data of the memory 4 becomes for 1 minute and 30 seconds (see (b) of FIG. 11) and the memory 4 so as to write the reproduced data at a rate of 15 Mbits/sec thereinto (see (c) of FIG. 11).

Since that time point, up to the time point of 89 minutes and 30 seconds where the magnetic tape arrives at the tape position E, the control circuit 18 controls the motor 19 again so as to feed the magnetic tape 8 normally (see (b) of FIG. 11) and the memory 4 so as to write the reproduced data thereinto at a rate of 5 Mbits/sec.

When the magnetic tape 8 arrives at the tape position E where recording of the "program 4" is finished at the time point of 89 minutes and 30 seconds, only reading out the data from the memory 4 is operated and the amount of the residual data of the memory 4 becomes zero at the time point of 91 minutes, thus finishing reproduction of the "program 4".

Figure 12:
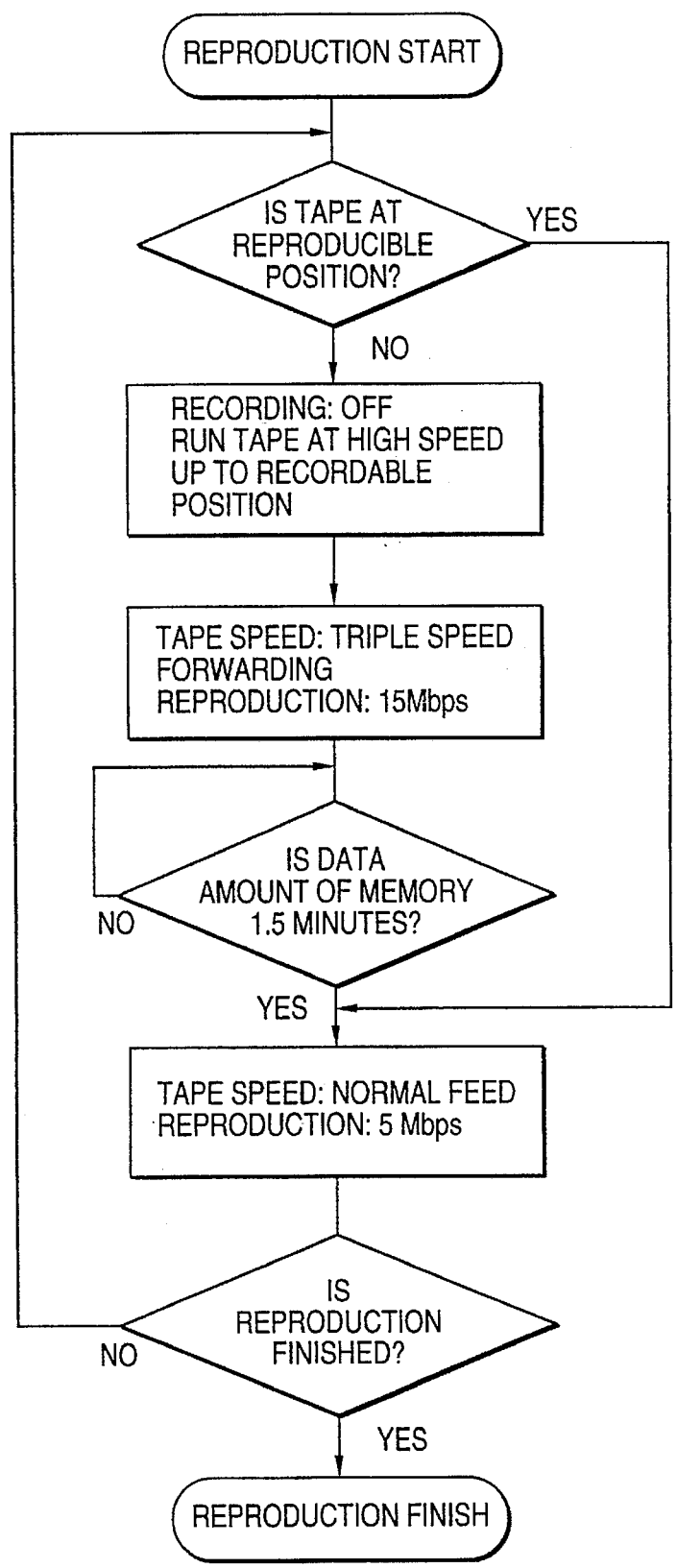
FIG. 12 is a flowchart for explaining an operation of the magnetic tape recording/reproducing apparatus according to the second embodiment when reproducing.

In addition, a flow diagram of the operation of the apparatus according to the second embodiment when reproducing controlled by the control circuit 18 is schematically shown in FIG. 12. Though not shown in FIG. 12, reading out of the data from the memory 4 is always made at a rate of 5 Mbits/sec during reproduction.

As explained above, similar to the apparatus of the first embodiment, the apparatus of the second embodiment provides a large number of advantages compared with the convention VTRs.

First, in the case of recording, operations such as rewinding and fast forwarding in order to make an access to a recordable position of the magnetic tape 8 within the tape cartridge 9 are not needed entirely. In addition, since the waiting time for making an access to a recordable range of the magnetic tape is not needed, even in the case of rapid picture recording, the program can be recorded from the beginning. Furthermore, there is not necessarily needed one program that is recorded into the sequential positions on the magnetic tape 8. Accordingly, all parts of the magnetic tape 8 can be effectively utilized. Even in the case of reproduction, operations such as rewinding and fast forwarding for making an access to the desired program already recorded are not needed entirely.

Further in addition, since the operations such as rewinding and fast forwarding are not needed entirely, one tape cartridge makes picture recording for an extremely long time period possible (in this embodiment, 200 hours). As a result, there is no need to exchange the cartridge in most cases. Namely, such an annoyance can be eliminated that looks for a recordable cassette when recording or a cassette having the desired program recorded when reproducing.

Furthermore, the apparatus of this embodiment also has the memory 4 made of semiconductor memory, but is not limited thereto, and the magnetic disk 40 may be employed as shown in FIG. 8. Consequently, the memory having a large storage capacity can be easily realized compared with the case of using a semiconductor memory. Further in addition, memory means other than semiconductor memory and magnetic disk, such as an optical disk and a magneto-optical disk, can be employed for this purpose.

What is claimed is:

1. A magnetic tape recording/reproducing apparatus for recording input data which are inputted sequentially at a first data rate onto a magnetic recording tape in a recording mode and reproducing the recorded data in a reproduction mode, comprising:

tape running means for running the magnetic recording tape from one position to another;

recording and reproducing means for recording the input data onto the magnetic recording tape at a data rate and for reproducing the recorded data from the magnetic recording tape in the reproduction mode;

data memory means, coupled to the recording and reproducing means, for temporarily storing therein the input data before being fed to the recording and reproducing means in the recording mode and for temporarily storing therein reproduced data from the recording and reproducing means in the reproducing mode; and control means for controlling the tape running means, the recording and reproducing means and the data memory means to cooperate such that, in the recording mode, (1) the input data are continuously written into the data memory means at the first data rate and (2) the written data are intermittently read out from the data memory means and intermittently recorded onto the magnetic recording tape by automatically repeating (2a) a recording operation in which the written data are read out from the data memory means at a second data rate which is higher than the first data rate and recorded onto the magnetic recording tape and (2b) a first waiting operation in which the written data are not read out from the data memory means and not recorded onto the magnetic recording tape, and such that, in the reproduction mode, (3) the recorded data are intermittently reproduced from the magnetic recording tape and intermittently written into the data memory means by automatically repeating (3a) a reproducing operation in which the recorded data are reproduced from the magnetic recording tape and written into the data memory means at the second data rate and (3b) a second waiting operation in which the recorded data are not reproduced from the magnetic recording tape and not written into the data memory means and (4) the written data are continuously read out from the data memory means at the first data rate.

2. An apparatus according to claim 1, wherein the data memory means has one of a semiconductor memory and a disk-type recording medium.

3. An apparatus according to claim 1, wherein the first data rate is Q bit/sec, where Q is a positive real number and wherein when the tape running means transfers the magnetic recording tape from one position to another within a time period T for continuously recording data from the data memory means, where T is a positive real number, and the data memory has a storage capacity of at least Q·T bits.

4. An apparatus according to claim 1, further comprising means for producing indication information indicating whether or not the magnetic recording tape is in a recordable position in the recording mode, wherein the control means is responsive to the indication information for controlling the tape running means, the magnetic recording and reproducing means and the data memory means in the recording mode to operate in the first waiting operation, when the indication information indicates that the magnetic recording tape is not in a recordable position, such that the data stored in the data memory means are not read out from the data memory means and not recorded onto the magnetic recording tape and the magnetic recording tape is run until the magnetic recording tape moves to a position in which the indication information indicates that the magnetic recording tape is in a recordable position.

5. An apparatus according to claim 1, further comprising means for producing indication information indicating whether or not the magnetic recording tape is in a reproducible position in the reproduction mode, wherein the control means is responsive to the indication information for controlling the tape running means, the magnetic recording and reproducing means and the data memory means in the reproduction mode to operate in the second waiting operation, when the indication information indicates that the magnetic recording tape is not in a reproducible position, such that the recorded data are not reproduced from the magnetic recording tape and not written into the data memory means until the magnetic recording tape is transferred to a position in which the indication signal indicates that the magnetic recording tape is in a reproducible position.

6. An apparatus according to claim 1, wherein the control means controls the tape running means, the magnetic recording and reproducing means and the data memory means in the recording mode to automatically repeat the recording operation and the first waiting operation such that (2a) in the recording operation, the data stored in the data memory means are read out from the data memory means and recorded onto the magnetic recording tape from a time when an amount of the data stored in the data memory means exceeds a first predetermined data amount until a time when the amount of the data stored in the data memory means becomes a second predetermined data amount which is smaller than the first predetermined data amount, and (2b) in the first waiting operation, the magnetic recording tape is stopped and the data stored in the data memory means are not read out from the data memory means and not recorded onto the magnetic recording tape from the time when the amount of the data stored in the data memory means becomes the second predetermined data amount until a time when the amount of the data stored in the data memory means again becomes the first predetermined data amount.

7. A apparatus according to claim 1, wherein the control means controls the tape running means, the magnetic recording and reproducing means and the data memory means in the reproduction mode to automatically repeat the reproducing operation and the second waiting operation such that (3a) in the reproducing operation, the recorded data are reproduced from the magnetic recording tape and written into the data memory means from a time when an amount of the data stored in the data memory means becomes smaller than a first predetermined data amount until a time when the amount of the data stored in the data memory means becomes a second predetermined data amount which is larger than the first predetermined data amount and (3b) in the second waiting operation, the magnetic recording tape is stopped and the recorded data are not reproduced from the magnetic recording tape and not written into the data memory means from the time when the amount of the data stored in the data memory means becomes the second predetermined data amount until a time when the amount of the data stored in the data memory means again becomes the first predetermined data amount.

* * * * *